US008854282B1

(12) United States Patent  
Wong

(10) Patent No.: US 8,854,282 B1
(45) Date of Patent: Oct. 7, 2014

(54) MEASUREMENT METHOD

(75) Inventor: Adrian Wong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 451 days.

(21) Appl. No.: 13/225,903

(22) Filed: Sep. 6, 2011

(51) Int. Cl.
*G09G 5/00* (2006.01)

(52) U.S. Cl.
USPC ............................................ 345/8; 345/7

(58) Field of Classification Search
CPC .............. G02B 27/017; G02B 23/125; G02B 27/0178; G02B 27/0187; G02B 27/0138; G02B 27/0093; G02B 27/01; G06F 3/013; G06F 1/163; G06F 3/012; G06F 3/011; G06F 3/04815; G06F 3/0346
USPC ........................................................ 345/8–9
See application file for complete search history.

(56) References Cited

U.S. PATENT DOCUMENTS

| | | | |
|---|---|---|---|
| 5,005,213 A * | 4/1991 | Hanson et al. ................. 398/119 |
| 5,838,262 A * | 11/1998 | Kershner et al. .............. 340/945 |
| 5,950,202 A * | 9/1999 | Durward et al. ...................... 1/1 |
| 6,396,509 B1 * | 5/2002 | Cheng ............................ 715/706 |
| 7,029,121 B2 | 4/2006 | Edwards |
| 7,106,204 B2 * | 9/2006 | Pilu et al. .................... 340/573.1 |
| 7,289,130 B1 * | 10/2007 | Satoh et al. .................... 345/629 |
| 8,175,297 B1 * | 5/2012 | Ho et al. ........................ 381/122 |
| 8,487,772 B1 * | 7/2013 | Higgins ...................... 340/573.1 |
| 2004/0131232 A1 * | 7/2004 | Meisner et al. ............... 382/103 |
| 2006/0247049 A1 * | 11/2006 | Noro et al. ...................... 463/37 |
| 2006/0284791 A1 * | 12/2006 | Chen et al. ......................... 345/8 |
| 2008/0136916 A1 * | 6/2008 | Wolff ............................. 348/169 |
| 2008/0147488 A1 | 6/2008 | Tunick et al. |
| 2009/0033588 A1 * | 2/2009 | Kajita et al. .................... 345/2.3 |
| 2010/0004977 A1 * | 1/2010 | Marci et al. ...................... 705/10 |
| 2010/0056274 A1 * | 3/2010 | Uusitalo et al. ................. 463/31 |
| 2010/0069035 A1 * | 3/2010 | Johnson ...................... 455/404.1 |
| 2010/0119072 A1 * | 5/2010 | Ojanpera ........................ 381/17 |
| 2010/0174586 A1 | 7/2010 | Berg, Jr. et al. |
| 2010/0277485 A1 * | 11/2010 | Zalewski ....................... 345/502 |
| 2011/0213664 A1 * | 9/2011 | Osterhout et al. ......... 705/14.58 |
| 2011/0242486 A1 * | 10/2011 | Ebisawa ........................ 351/206 |
| 2012/0050141 A1 * | 3/2012 | Border et al. ...................... 345/8 |
| 2012/0206452 A1 * | 8/2012 | Geisner et al. ................ 345/419 |
| 2012/0249416 A1 * | 10/2012 | Maciocci et al. ............. 345/156 |
| 2012/0249544 A1 * | 10/2012 | Maciocci et al. ............. 345/419 |
| 2012/0249590 A1 * | 10/2012 | Maciocci et al. ............. 345/633 |
| 2012/0249591 A1 * | 10/2012 | Maciocci et al. ............. 345/633 |
| 2012/0249741 A1 * | 10/2012 | Maciocci et al. ............... 348/46 |
| 2012/0274750 A1 * | 11/2012 | Strong ............................ 348/52 |
| 2012/0293506 A1 * | 11/2012 | Vertucci et al. ............... 345/419 |
| 2012/0293548 A1 * | 11/2012 | Perez et al. .................... 345/633 |
| 2013/0214998 A1 * | 8/2013 | Andes et al. ...................... 345/8 |
| 2013/0222215 A1 * | 8/2013 | Kobayashi ......................... 345/8 |
| 2013/0300637 A1 * | 11/2013 | Smits et al. ....................... 345/8 |

* cited by examiner

*Primary Examiner* — Christopher E Leiby
(74) *Attorney, Agent, or Firm* — McDonnell Boehnen Hulbert & Berghoff LLP

(57) ABSTRACT

A system and method of determining regions of interest via collective gaze of multiple wearable head-mounted displays (HMDs) is disclosed. Each of a plurality of HMDs can be communicatively connected with a communication network, and can transmit respective location-orientation data to the communication network or a server or server system in the network. Location-orientation data from the plurality can be collected and analyzed by the server in order to determine spatial regions that are or appear to be focal points of collective or common gaze of two or more HMDs of the plurality. Information about those regions or about the analysis that identified them may thereafter be provided back to one or more HMDs or other wearable computing devices.

39 Claims, 13 Drawing Sheets

MEASUREMENT METHOD

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

SUMMARY

In one aspect, an example embodiment presented herein provides, in a device, a computer-implemented method comprising: receiving respective location-orientation data from each of a first plurality of wearable head-mounted displays (HMDs), the respective location-orientation data including information indicative of a respective location and a respective field-of-view (FOV) pointing direction of each of the first plurality of wearable HMDs; making a first determination that the FOV pointing directions of the first plurality are within a first threshold distance of intersecting each other within a first region of space; determining a first weighting value of the first region of space based on at least one of (i) a number of wearable HMDs in the first plurality, (ii) a size of a geographic region within which the wearable HMDs of the first plurality are located, (iii) a size of the first region of space, (iv) a size of the first threshold distance, and (v) a respective distance of the first region of space from each wearable HMD of the first plurality; determining three-dimensional spatial coordinates of a first point indicative of a location of the first region of space, and assigning the first weighting value to the coordinates of the first point; and transmitting information indicative of the first weighting value and the coordinates of the first point.

In another aspect, an example embodiment presented herein provides, in a wearable head-mounted display (HMD), a computer-implemented method comprising: determining a location and a field-of-view (FOV) pointing direction of the wearable HMD; transmitting a data message to a device, the data message including information indicative of the determined location and the determined FOV pointing direction; receiving from the device information indicative of a three-dimensional location of one or more regions within which respective FOV pointing directions of two or more wearable HMDs are within a threshold of intersecting each other; and displaying information indicative of the location of at least one region of the one or more regions.

In another aspect, an example embodiment presented herein provides a device comprising: one or more processors; memory; and machine-readable instructions stored in the memory that, when executed by the one or more processors, cause the server system to carry out functions including: receiving respective location-orientation data from each of a first plurality of wearable head-mounted displays (HMDs), the respective location-orientation data including information indicative of a respective location and a respective field-of-view (FOV) pointing direction of each of the first plurality of wearable HMDs, making a first determination that the FOV pointing directions of the first plurality are within a first threshold distance of intersecting each other within a first region of space, determining a first weighting value of the first region of space based on at least one of (i) a number of wearable HMDs in the first plurality, (ii) a size of a geographic region within which the wearable HMDs of the first plurality are located, (iii) a size of the first region of space, (iv) a size of the first threshold distance, and (v) a respective distance of the first region of space from each wearable HMD of the first plurality, determining three-dimensional spatial coordinates of a first point indicative of a location of the first region of space, and assigning the first weighting value to the coordinates of the first point, and transmitting information indicative of the first weighting value and the coordinates of the first point.

In another aspect, an example embodiment presented herein provides a wearable head-mounted display (HMD) comprising: a display device; one or more processors; memory; and machine-readable instructions stored in the memory that, when executed by the one or more processors, cause the wearable HMD to carry out functions including: determining a location and a field-of-view (FOV) pointing direction of the wearable HMD, transmitting a data message including information indicative of the determined location and the determined FOV pointing direction, receiving information indicative of a three-dimensional location of one or more regions within which respective FOV pointing directions of two or more wearable HMDs are within a threshold of intersecting each other, and displaying information indicative of the location of at least one region of the one or more regions.

In another aspect, an example embodiment presented herein provides a non-transitory computer-readable medium having instructions stored thereon that, upon execution by one or more processors of a device, cause the device to carry out functions comprising: receiving respective location-orientation data from each of a first plurality of wearable head-mounted displays (HMDs), the respective location-orientation data including information indicative of a respective location and a respective field-of-view (FOV) pointing direction of each of the first plurality of wearable HMDs; making a first determination that the FOV pointing directions of the first plurality are within a first threshold distance of intersecting each other within a first region of space; determining a first weighting value of the first region of space based on at least one of (i) a number of wearable HMDs in the first plurality, (ii) a size of a geographic region within which the wearable HMDs of the first plurality are located, (iii) a size of the first region of space, (iv) a size of the first threshold distance, and (v) a respective distance of the first region of space from each wearable HMD of the first plurality; determining three-dimensional spatial coordinates of a first point indicative of a location of the first region of space, and assigning the first weighting value to the coordinates of the first point; and transmitting information indicative of the first weighting value and the coordinates of the first point.

In another aspect, an example embodiment presented herein provides a non-transitory computer-readable medium having instructions stored thereon that, upon execution by one or more processors of a wearable head-mounted display (HMD), cause the wearable HMD to carry out functions comprising: determining a location and a field-of-view (FOV) pointing direction of the wearable HMD; transmitting a data message including information indicative of the determined location and the determined FOV pointing direction; receiving information indicative of a three-dimensional location of one or more regions within which respective FOV pointing directions of two or more wearable HMDs are within a threshold of intersecting each other; and displaying information indicative of the location of at least one region of the one or more regions.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1A:
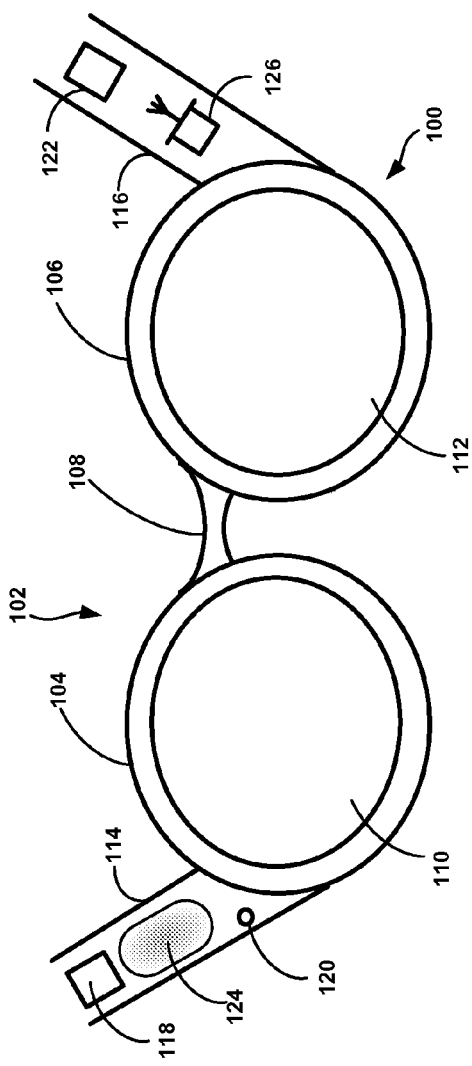
FIG. 1a is a first view of an example wearable head-mounted display for receiving, transmitting and displaying data, in accordance with an example embodiment.

In accordance with example embodiments, a wearable computing device may include a head-mounted display (HMD) having eyeglasses or goggles that can combine computer-generated images displayed on the eye-facing surfaces of lens elements with an actual field of view observable through the lens elements. The capability of presenting the combination of the actual, observed field of view with the displayed, computer-generated images can be complemented or supplemented with various functions and applications, as well as with various forms of user input and sensory data from ancillary wearable computing components, to provide rich and varied experiences and utility for a user or wearer of the HMD.

An example of sensory data is location and field-of-view pointing direction of the HMD (e.g., of the wearer of the HMD). Location can correspond to geographic (or geodetic) location of the HMD. The field-of-view pointing direction includes what is referred to herein as the "gaze direction" or simply "gaze" of the HMD. Taken together, location (or information indicative thereof) and field-of-view pointing direction (or information indicative thereof) comprises what are referred to herein as "location-orientation data." Location-orientation data can also include a timestamp or other indicator of when a particular location and field-of-view pointing direction was measured or determined.

In further accordance with example embodiments, an HMD can be communicatively connected with a communication network, and can transmit location-orientation data to the communication network or a server or server system (other device) in the network. In still further accordance with example embodiments, a plurality of HMDs can transmit respective location-orientation data to the server, which may then collect the respective location-orientation data.

In yet further accordance with example embodiments, a plurality of HMDs could additionally or alternatively be communicatively connected with one another either directly (e.g., a wireless protocol such as Bluetooth) or via a network (e.g., a cellular network, WiFi, etc.). In such an arrangement the HMDs of the plurality could directly share respective location-orientation data, as well as share interpretation and/or analysis of the shared data.

In accordance with example embodiments, location-orientation data from a plurality of HMDs can be collected and analyzed in order to determine spatial regions that are or appear to be focal points of collective or common gaze of two or more HMDs of the plurality. Information about those regions or about the analysis that identified them may thereafter be provided back to one or more HMDs or other wearable computing devices. Analysis of the location-orientation data can be carried out by the server or server system in the communication network, or by one or more of the HMDs of the plurality in a direct-data-sharing arrangement. The information provided back to the one or more HMDs can be transmitted to them from the server, via the network, or from an HMD (e.g., directly or via a network).

Analysis of the collected location-orientation data from a plurality of HMDs can include determination of a qualitative or quantitative significance of identified regions, identification of physical (real) objects contained in the identified regions, and determination of likelihoods that identified regions are actual (intentional) focal points of collective gaze as opposed to chance intersections of gaze directions. Analysis can also include filtering based on location, such that the plurality of HMDs can be determined to correspond to HMDs located in a common area (e.g., a sports arena) or HMDs within a threshold distance of one another. Additionally or alternatively, filtering can be based on first identifying spatial regions of intersecting (or nearly intersecting) gazes, and thereafter determining a measure of "interest" or "importance" to associate with the identified regions.

In further accordance with example embodiments, an HMD could use information about identified regions of interest received from the server (or other HMD) to update or modify information presented in a display region of the HMD. For example, an HMD located in a football stadium (or other sports arena) and receiving information indicating a location of interest containing the actual football (e.g., currently in play on the football field of the stadium) could present a visual cue (e.g. an icon of a football) in the display indicating where in the FOV of the display the actual football can be viewed. As another example, an HMD could alert the user or wearer of an event of interest, such as street-corner music performance, and present a visual cue to aid the user or wearer in finding and viewing the event.

In still further accordance with example embodiments, information about identified regions of interest could be generated (and provided) in the form of a three-dimensional "heat map," in which regions of interest are coded according to colors (or color ranges) and spatial diffusion (e.g., region size and boundary sharpness). The heat map or other renderings of information about identified regions of interest could also be provided by the server system (or other HMD) to other entities connected to the network. For example, information about a region of interest determined to contain a traffic accident could be provide to a public safety entity. As another example, information about a region of interest determined to contain a billboard advertisement could be provided to an advertiser or a vendor or product manufacturer that is the subject of the advertisement.

2. Example Systems and Network a. Example Wearable Computing System

In accordance with an example embodiment, a wearable computing system may comprise various components, including one or more processors, one or more forms of memory, one or more sensor devices, one or more I/O devices, one or more communication devices and interfaces, and a head-mounted display (HMD), all collectively arranged in a manner to make the system wearable by a user. The wearable computing system may also include machine-language logic (e.g., software, firmware, and/or hardware instructions) stored in one or another form of memory and executable by one or another processor of the system in order to implement one or more programs, tasks, applications, or the like. The wearable computing system may be configured in various form factors, including, without limitation, integrated in the HMD as a unified package, or distributed, with one or more elements integrated in the HMD and one or more others separately wearable (e.g., as a garment, in a garment pocket, as jewelry, etc.).

Although described above as a component of a wearable computing system, it is sometimes convenient to consider an HMD to be (or at least to represent) the wearable computing system. Accordingly, unless otherwise specified, the terms "wearable head-mounted display" (or "wearable HMD") or just "head-mounted display" (or "HMD") will be used herein to refer to a wearable computing system, in either an integrated (unified package) form, a distributed (or partially distributed) form, or other wearable form.

FIG. 1a illustrates an example wearable computing system 100 for receiving, transmitting, and displaying data. In accordance with an example embodiment, the wearable computing system 100 is depicted as a wearable HMD taking the form of eyeglasses 102. However, it will be appreciated that other types of wearable computing devices could additionally or alternatively be used.

As illustrated in FIG. 1a, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic or metal, or may be formed of a hollow structure of similar material so as to allow wiring and component interconnects to be internally routed through the eyeglasses 102. Each of the lens elements 110 and 112 may include a material on which an image or graphic can be displayed, either directly or by way of a reflecting surface. In addition, at least a portion of each lens elements 110 and 112 may be sufficiently transparent to allow a user to see through the lens element. These two features of the lens elements could be combined; for example, to provide an augmented reality or heads-up display where the projected image or graphic can be superimposed over or provided in conjunction with a real-world view as perceived by the user through the lens elements.

The extending side-arms 114 and 116 are each projections that extend away from the frame elements 104 and 106, respectively, and are positioned behind a user's ears to secure the eyeglasses 102 to the user. The extending side-arms 114 and 116 may further secure the eyeglasses 102 to the user by extending around a rear portion of the user's head. Additionally or alternatively, the wearable computing system 100 may be connected to or be integral to a head-mounted helmet structure. Other possibilities exist as well.

The wearable computing system 100 may also include an on-board computing system 118, a video camera 120, a sensor 122, a finger-operable touch pad 124, and a communication interface 126. The on-board computing system 118 is shown to be positioned on the extending side-arm 114 of the eyeglasses 102; however, the on-board computing system 118 may be provided on other parts of the eyeglasses 102. The on-board computing system 118 may include, for example, a one or more processors and one or more forms of memory. The on-board computing system 118 may be configured to receive and analyze data from the video camera 120, the sensor 122, the finger-operable touch pad 124, and the wireless communication interface 126 (and possibly from other sensory devices and/or user interfaces) and generate images for output to the lens elements 110 and 112.

The video camera 120 is shown to be positioned on the extending side-arm 114 of the eyeglasses 102; however, the video camera 120 may be provided on other parts of the eyeglasses 102. The video camera 120 may be configured to capture images at various resolutions or at different frame rates. Video cameras with a small form factor, such as those used in cell phones or webcams, for example, may be incorporated into an example of the wearable system 100. Although FIG. 1a illustrates one video camera 120, more video cameras may be used, and each may be configured to capture the same view, or to capture different views. For example, the video camera 120 may be forward facing to capture at least a portion of a real-world view perceived by the user. This forward facing image captured by the video camera

120 may then be used to generate an augmented reality where computer generated images appear to interact with the real-world view perceived by the user.

The sensor 122 may be used to measure and/or determine location, orientation, and motion information, for example. Although represented as a single component mounted on the extending side-arm 116 of the eyeglasses 102, the sensor 122 could in practice include more than one type of sensor device or element provided on one or more different parts of the eyeglasses 102.

By way of example and without limitation, the sensor 122 could include one or more of motion detectors (e.g., one or more gyroscopes and/or accelerometers), one or more magnetometers, and a location determination device (e.g., a GPS device). Gyroscopes, accelerometers, and magnetometers may be integrated into what is conventionally called an "inertial measurement unit" (IMU). An IMU may, in turn, be part of an "attitude heading reference system" (AHRS) that computes (e.g., using the on-board computing system 118) a pointing direction of the HMD from IMU sensor data, possibly together with location information (e.g., from a GPS device). Accordingly, the sensor 122 could include or be part of an AHRS. Other sensing devices or elements may be included within the sensor 122 and other sensing functions may be performed by the sensor 122.

The finger-operable touch pad 124, shown mounted on the extending side-arm 114 of the eyeglasses 102, may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel to the pad surface, in a direction normal to the pad surface, or both, and may also be capable of sensing a level of pressure applied. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge of the finger-operable touch pad 124. Although not shown in FIG. 1a, the eyeglasses 102 could include one more additional finger-operable touch pads, for example attached to the extending side-arm 316, which could be operated independently of the finger-operable touch pad 124 to provide a duplicate and/or different function.

The communication interface 126 could include an antenna and transceiver device for support of wireline and/or wireless communications between the wearable computing system 100 and a remote device or communication network. For instance, the communication interface 126 could support wireless communications with any or all of 3G and/or 4G cellular radio technologies (e.g., CDMA, EVDO, GSM, UMTS, LTE, WiMAX), as well as wireless local or personal area network technologies such as a Bluetooth, Zigbee, and WiFi (e.g., 802.11a, 802.11b, 802.11g). Other types of wireless access technologies could be supported as well. The communication interface 126 could enable communications between the wearable computing system 100 and one or more end devices, such as another wireless communication device (e.g., a cellular phone or another wearable computing device), a user at a computer in a communication network, or a server or server system in a communication network. The communication interface 126 could also support wired access communications with Ethernet or USB connections, for example.

Figure 1B:
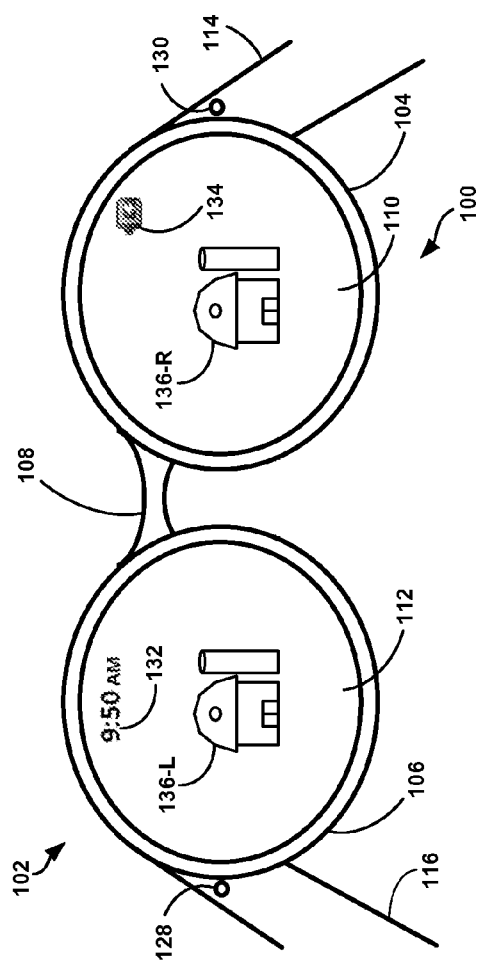
FIG. 1b is a second view of an example wearable head-mounted display of FIG. 1a, in accordance with an example embodiment.

FIG. 1b illustrates another view of the wearable computing system 100 of FIG. 1a. As shown in FIG. 1b, the lens elements 110 and 112 may act as display elements. In this regard, the eyeglasses 102 may include a first projector 128 coupled to an inside surface of the extending side-arm 116 and configured to project a display image 132 onto an inside surface of the lens element 112. Additionally or alternatively, a second projector 130 may be coupled to an inside surface of the extending side-arm 114 and configured to project a display image 134 onto an inside surface of the lens element 110.

The lens elements 110 and 112 may act as a combiner in a light projection system and may include a coating that reflects the light projected onto them from the projectors 128 and 130. Alternatively, the projectors 128 and 130 could be scanning laser devices that interact directly with the user's retinas.

A forward viewing field may be seen concurrently through lens elements 110 and 112 with projected or displayed images (such as display images 132 and 134). This is represented in FIG. 1b by the field of view (FOV) object 136-L in the left lens element 112 and the same FOV object 136-R in the right lens element 110. The combination of displayed images and real objects observed in the FOV may be one aspect of augmented reality, referenced above. In addition, images could be generated for the right and left lens elements produce a virtual three-dimensional space when right and left images are synthesized together by a wearer of the HMD. Virtual objects could then be made to appear to be located in and occupy the actual three-dimensional space viewed transparently through the lenses.

In alternative embodiments, other types of display elements may also be used. For example, lens elements 110, 112 may include: a transparent or semi-transparent matrix display, such as an electroluminescent display or a liquid crystal display; one or more waveguides for delivering an image to the user's eyes; and/or other optical elements capable of delivering an in focus near-to-eye image to the user. A corresponding display driver may be disposed within the frame elements 104 and 106 for driving such a matrix display. Alternatively or additionally, a scanning laser device, such as low-power laser or LED source and accompanying scanning system, can draw a raster display directly onto the retina of one or more of the user's eyes. The user can then perceive the raster display based on the light reaching the retina.

Although not shown in FIGS. 1a and 1b, the wearable system 100 can also include one or more components for audio output. For example, wearable computing system 100 can be equipped with speaker(s), earphone(s), and/or earphone jack(s). Other possibilities exist as well.

While the wearable computing system 100 of the example embodiment illustrated in FIGS. 1a and 1b is configured as a unified package, integrated in the HMD component, other configurations are possible as well. For example, although not explicitly shown in FIGS. 1a and 1b, the wearable computing system 100 could be implemented in a distributed architecture in which all or part of the on-board computing system 118 is configured remotely from the eyeglasses 102. For example, some or all of the on-board computing system 118 could be made wearable in or on clothing as an accessory, such as in a garment pocket or on a belt clip. Similarly, other components depicted in FIGS. 1a and/or 1b as integrated in the eyeglasses 102 could also be configured remotely from the HMD component. In such a distributed architecture, certain components might still be integrated in HMD component. For instance, one or more sensors (e.g., an accelerometer and/or an orientation sensor) could be integrated in eyeglasses 102.

In an example distributed configuration, the HMD component (including other integrated components) could communicate with remote components via the communication interface 126 (or via a dedicated connection, distinct from the communication interface 126). By way of example, a wired (e.g. USB or Ethernet) or wireless (e.g., WiFi or Bluetooth) connection could support communications between a remote computing system and a HMD component. Additionally, such a communication link could be implemented between a HMD component and other remote devices, such as a laptop computer or a mobile telephone, for instance.

Figure 2:
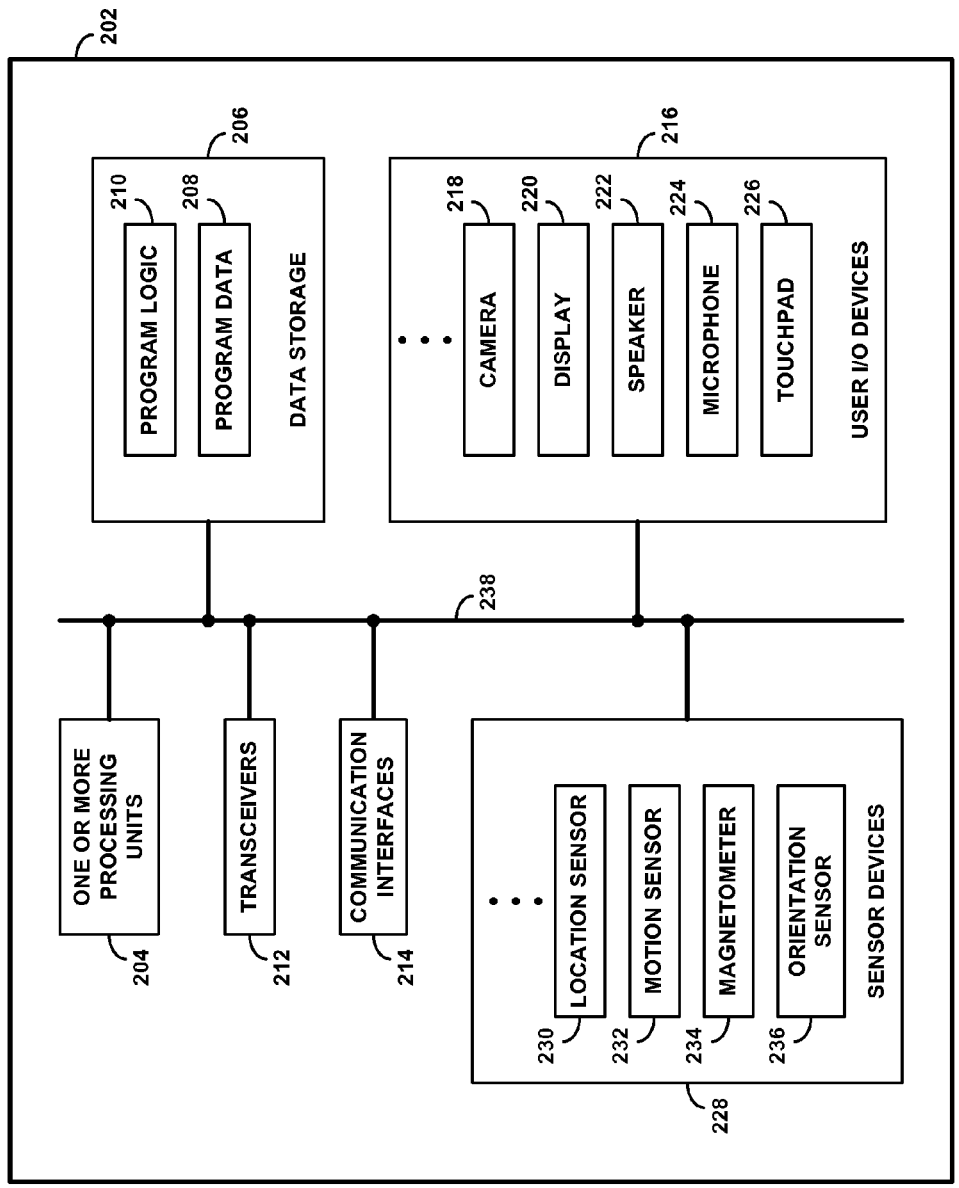
FIG. 2 is block diagram of a wearable head-mounted display, in accordance with an example embodiment.

FIG. 2 is a block diagram depicting functional components of an example wearable computing system 202 in accordance with an example embodiment. As shown in FIG. 2, the example wearable computing system 202 includes one or more processing units 204, data storage 206, transceivers 212, communication interfaces 214, user input/output (I/O) devices 216, and sensor devices 228, all of which may be coupled together by a system bus 238 or other communicative interconnection means. These components may be arranged to support operation in accordance with an example embodiment of a wearable computing system, such as system 100 shown in FIGS. 1*a* and 1*b*, or other a wearable HMD.

The one or more processing units 204 could include one or more general-purpose processors (e.g., INTEL microprocessors) and/or one or more special-purpose processors (e.g., dedicated digital signal processor, application specific integrated circuit, etc.). In turn, the data storage 206 could include one or more volatile and/or non-volatile storage components, such as magnetic or optical memory or disk storage. Data storage 206 can be integrated in whole or in part with processing unit 204, as cache memory or registers for instance. As further shown, data storage 206 is equipped to hold program logic 208 and program data 210.

Program logic 208 could include machine language instructions (e.g., software code, firmware code, etc.) that define routines executable by the one or more processing units 204 to carry out various functions described herein. Program data 210 could contain data used or manipulated by one or more applications or programs executable by the one or more processors. Such data can include, among other forms of data, program-specific data, user data, input/output data, sensor data, or other data and information received, stored, retrieved, transmitted, analyzed, or modified in the course of execution of one or more programs or applications.

The transceivers 212 and communication interfaces 214 may be configured to support communication between the wearable computing system 202 and one or more end devices, such as another wireless communication device (e.g., a cellular phone or another wearable computing device), a user at a computer in a communication network, or a server or server system in a communication network. The transceivers 212 may be coupled with one or more antennas to enable wireless communications, for example, as describe above for the wireless communication interface 126 shown in FIG. 1*a*. The transceivers 212 may also be coupled with one or more wireline connectors for wireline communications such as Ethernet or USB. The transceivers 212 and communication interfaces 214 could also be used support communications within a distributed-architecture in which various components of the wearable computing system 202 are located remotely from one another. In this sense, the system bus 238 could include elements and/or segments that support communication between such distributed components.

As shown, the user I/O devices 216 include a camera 218, a display 220, a speaker 222, a microphone 224, and a touchpad 226. The camera 218 could correspond to the video camera 120 described in the discussion of FIG. 1*a* above. Similarly, the display 220 could correspond to an image processing and display system for making images viewable to a user (wearer) of an HMD. The display 220 could include, among other elements, the first and second projectors 128 and 130 coupled with lens elements 112 and 110, respectively, for generating image displays as described above for FIG. 1*b*. The touchpad 226 could correspond to the finger-operable touch pad 124, as described for FIG. 1*a*. The speaker 422 and microphone 224 could similarly correspond to components referenced in the discussion above of FIGS. 1*a* and 1*b*. Each of the user I/O devices 216 could also include a device controller and stored, executable logic instructions, as well as an interface for communication via the system bus 238.

The sensor devices 228, which could correspond to the sensor 122 described above for FIG. 1*a*, include a location sensor 230, a motion sensor 232, one or more magnetometers 234, and an orientation sensor 236. The location sensor 230 could correspond to a Global Positioning System (GPS) device, or other location-determination device (e.g. mobile phone system triangulation device, etc.). The motion sensor 232 could correspond to one or more accelerometers and/or one or more gyroscopes. A typical configuration may include three accelerometers oriented along three mutually orthogonal axes, for example. A similar configuration of three magnetometers can also be used.

The orientation sensor 236 could include or be part of an AHRS for providing theodolite-like functionality for determining an angular orientation of a reference pointing direction of the HMD with respect to a local terrestrial coordinate system. For instance, the orientation sensor could determine an altitude angle with respect to horizontal and an azimuth angle with respect to a reference directions, such as geographic (or geodetic) North, of a forward pointing direction of the HMD. Other angles and coordinate systems could be used as well for determining orientation.

The magnetometer 234 (or magnetometers) could be used to determine the strength and direction of the Earth's magnetic (geomagnetic) field as measured at a current location of the HMD. The magnetometer (or magnetometers) could be used as a compass, possibly in conjunction with the orientation sensor for determining the azimuth angle.

Each of the sensor devices 228 could also include a device controller and stored, executable logic instructions, as well as an interface for communication via the system bus 238.

It will be appreciated that there can be numerous specific implementations of a wearable computing system or wearable HMD, such as the wearable computing system 202 illustrated in FIG. 2. Further, one of skill in the art would understand how to devise and build such an implementation.

b. Example Network

In an example embodiment, an HMD can support communications with a network and with devices in or communicatively connected with a network. Such communications can include exchange of information between the HMD and another device, such as another connected HMD, a mobile computing device (e.g., mobile phone or smart phone), or a server. Information exchange can support or be part of services and/or applications, including, without limitation, uploading and/or downloading content (e.g., music, video, etc.), and client-server communications, among others.

Figure 3:
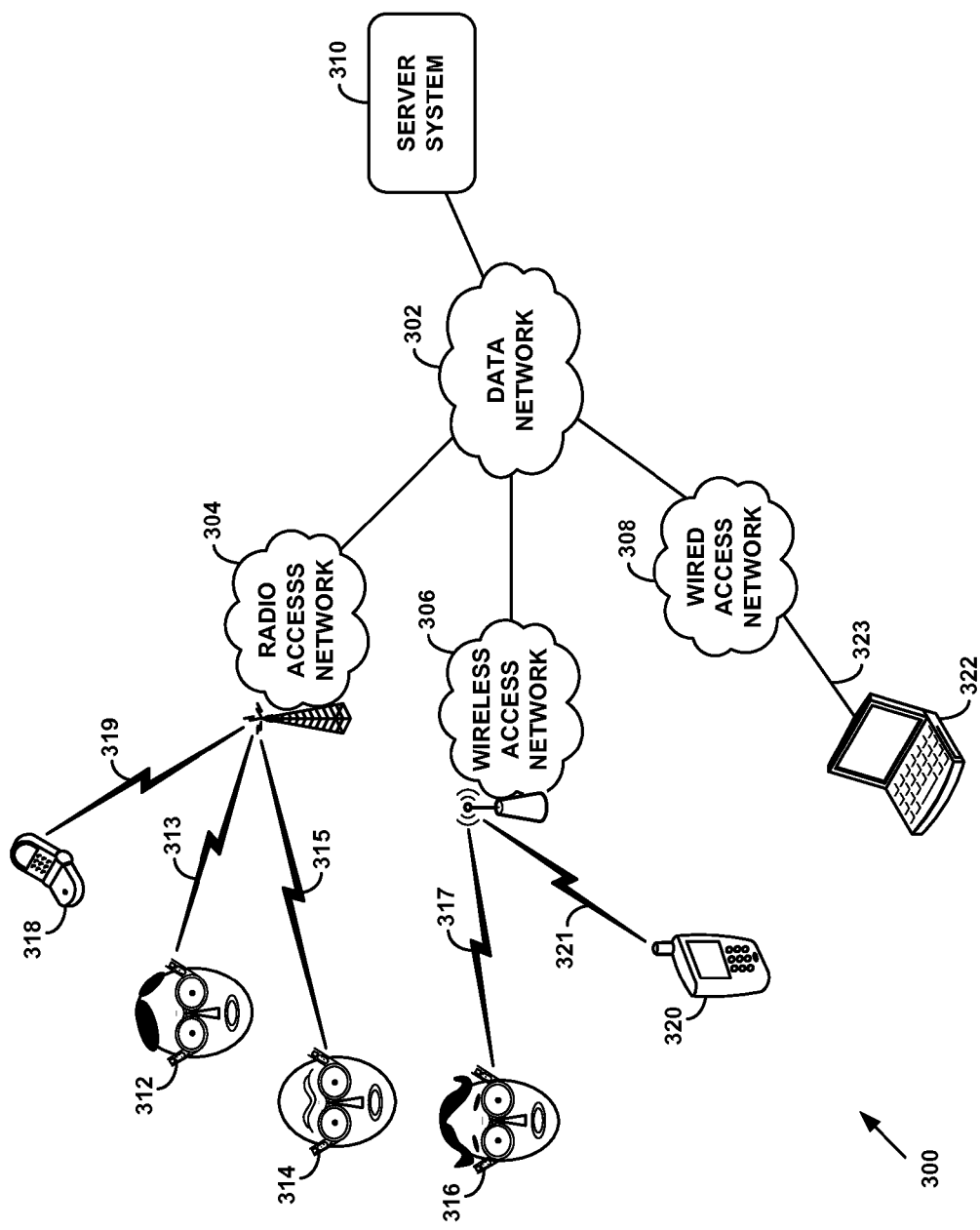
FIG. 3 is a simplified block diagram of a communication network in which example embodiments of determining regions of collective gaze of wearable head-mounted displays can be employed.

FIG. 3 illustrates one view of a network 300 in which one or more HMDs could engage in communications. As depicted, the network 300 includes a data network 302 that is connected to each of a radio access network (RAN) 304, a wireless access network 306, and a wired access network 308. The data network 302 could represent the one or more interconnected communication networks, such as or including the Internet. The radio access network 304 could represent a service provider's cellular radio network supporting, for instance, 3G and/or 4G cellular radio technologies (e.g., CDMA, EVDO, GSM, UMTS, LTE, WiMAX). The wireless access network 306 could represent a residential or hot-spot wireless area network supporting, such as, Bluetooth, Zig-Bee, and WiFi (e.g., 802.11a, 802.11b, 802.11g). The wired access network 308 could represent a residential or commercial local area network supporting, for instance, Ethernet.

The network 300 also includes a server system 310 connected to the data network 302. The server system 310 could represent a website or other network-based facility for providing one or another type of service to users. For instance, in accordance with an example embodiment, the server system 310 could receive gaze-direction information from a plurality of HMDs, and process the gaze-direction information to generate useful and/or interesting collective-gaze information that is then provided to one or more of the HMDs. As another example, the server system 310 could provide a network-based search service.

FIG. 3 also shows various end-user and/or client devices connected to the network 300 via one of the three access networks. By way of example, an HMD 312 is connected to the RAN 304 via an air interface 313 (e.g., a 3G or 4G technology), and an HMD 314 is connected to the RAN 304 via an air interface 315 (e.g., a 3G or 4G technology). Also by way of example, an HMD 316 is connected to the wireless access network 306 via an air interface 317 (e.g., a WiFi technology). In addition and also by way of example, a mobile phone 318 is shown connected to the RAN 304 via an air interface 319, a smart phone 320 is shown connected to the wireless access network 306 via an air interface 321, and a laptop computer 322 is shown connected to the wired access network 308 via a wired interface 323. Each of the end-user devices could communicate with one or another network-connected device via its respective connection with the network. It could be possible as well for some of these end-user devices to communicate directly with each other (or other end-user devices not shown).

Each of the HMDs 312, 314, and 316 is depicted as being worn by different user (each user being represented by a cartoon face) in order to signify possible user-related variables, circumstances, and applications that may be associated with each HMD. For instance, a gaze pointing direction of a given HMD will generally depend or be related to a corresponding direction in which a user (or wearer) of the given HMD is facing. However, for the purposes of most of the discussion herein it is usually sufficient to reference only an HMD without referencing the user (or wearer) the HMD. Explicit reference to or discussion of a user (or wearer) of an HMD will be made as necessary.

c. Example Server System

Figure 4A:
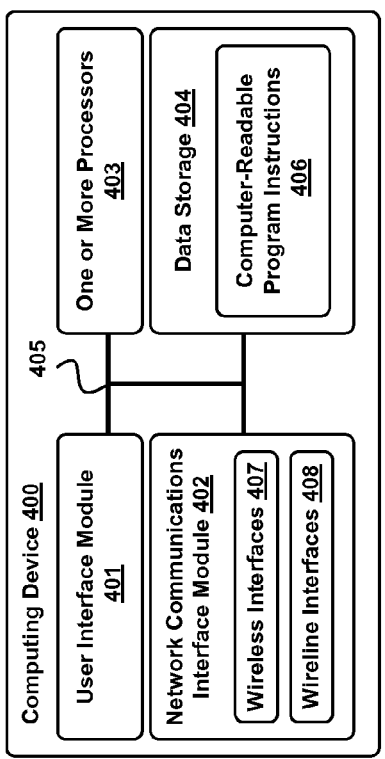
FIG. 4a is a block diagram of a computing device, in accordance with an example embodiment.
Figure 4B:
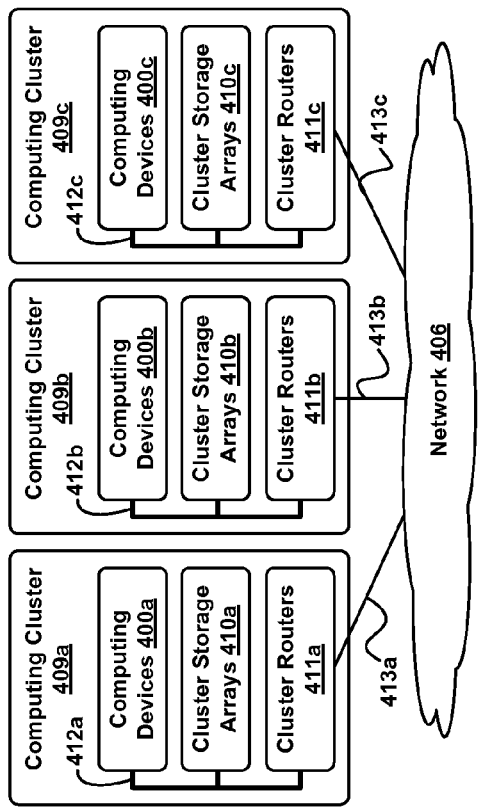
FIG. 4b depicts a network with clusters of computing devices of the type shown in FIG. 4a, in accordance with an example embodiment.

A network server, such as the server system 310 in FIG. 3, could take various forms and be implemented in one or more different ways. FIGS. 4a and 4b illustrate two example embodiments of a server system: an integrated system including a representative computing device (FIG. 4a), and a distributed system (FIG. 4b) including multiple representative computing devices, as well as additional system elements, communicatively connected together.

FIG. 4a is a block diagram of a computing device 400 in accordance with an example embodiment. The computing device 400 can include a user interface module 401, a network-communication interface module 402, one or more processors 403, and data storage 404, all of which can be linked together via a system bus, network, or other connection mechanism 405.

The user interface module 401 can be operable to send data to and/or receive data from external user input/output devices. For example, the user interface module 401 can be configured to send/receive data to/from user input devices such as a keyboard, a keypad, a touch screen, a computer mouse, a track ball, a joystick, and/or other similar devices, now known or later developed. The user interface module 401 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 401 can also be configured to generate audible output(s), such as a speaker, speaker jack, audio output port, audio output device, earphones, and/or other similar devices, now known or later developed.

The network-communications interface module 402 can include one or more wireless interfaces 407 and/or wireline interfaces 408 that are configurable to communicate via a network, such as the network 302 shown in FIG. 3. The wireless interfaces 407 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 408 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 402 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 403 can include one or more general purpose processors and/or one or more special purpose processors (e.g., digital signal processors, application specific integrated circuits, etc.). The one or more processors 403 can be configured to execute computer-readable program instructions 406 that are contained in the data storage 404 and/or other instructions as described herein.

The data storage 404 can include one or more computer-readable storage media that can be read or accessed by at least one of the processors 403. The one or more computer-readable storage media can include volatile and/or non-volatile storage components, such as optical, magnetic, organic or other memory or disc storage, which can be integrated in whole or in part with at least one of the one or more processors 403. In some embodiments, the data storage 404 can be implemented using a single physical device (e.g., one optical, magnetic, organic or other memory or disc storage unit), while in other embodiments, the data storage 404 can be implemented using two or more physical devices.

Computer-readable storage media associated with data storage 404 and/or other computer-readable media described herein can also include non-transitory computer-readable media such as computer-readable media that stores data for short periods of time like register memory, processor cache, and random access memory (RAM). Computer-readable storage media associated with data storage 404 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 404 and/or other computer-readable media described herein can also be any other volatile or non-volatile storage systems. Computer-readable storage media associated with data storage 404 and/or other computer-readable media described herein can be considered computer readable storage media for example, or a tangible storage device.

The data storage 404 can include computer-readable program instructions 406 and perhaps additional data. In some embodiments, the data storage 404 can additionally include storage required to perform at least part of the herein-described techniques, methods, and/or at least part of the functionality of the herein-described devices and networks.

FIG. 4b depicts a network 406 with computing clusters 409a, 409b, and 409c in accordance with an example embodiment. In FIG. 4b, functions of a network server, such as the server system 310 in FIG. 3, can be distributed among three computing clusters 409a, 409b, and 408c. The computing cluster 409a can include one or more computing devices 400a, cluster storage arrays 410a, and cluster routers 411a, connected together by local cluster network 412a. Similarly, computing cluster 409b can include one or more computing devices 400b, cluster storage arrays 410b, and cluster routers 411b, connected together by local cluster network 412b. Likewise, computing cluster 409c can include one or more computing devices 400c, cluster storage arrays 410c, and cluster routers 411c, connected together by a local cluster network 412c.

In some embodiments, each of computing clusters 409a, 409b, and 409c can have an equal number of computing devices, an equal number of cluster storage arrays, and an equal number of cluster routers. In other embodiments, however, some or all of computing clusters 409a, 409b, and 409c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

Cluster storage arrays 410a, 410b, and 410c of computing clusters 409a, 409b, and 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

The cluster routers 411a, 411b, and 411c in the computing clusters 409a, 409b, and 409c can include networking equipment configured to provide internal and external communications for the computing clusters. For example, the cluster routers 411a in the computing cluster 409a can include one or more internet switching and/or routing devices configured to provide (i) local area network communications between the computing devices 400a and the cluster storage arrays 401a via the local cluster network 412a, and/or (ii) wide area network communications between the computing cluster 409a and the computing clusters 409b and 409c via the wide area network connection 413a to the network 406. The cluster routers 411b and 411c can include network equipment similar to the cluster routers 411a, and the cluster routers 411b and 411c can perform similar networking functions for the computing clusters 409b and 409b that the cluster routers 411a perform for the computing cluster 409a.

3. Collective Gaze of Multiple Head-Mounted Displays

As mentioned in the Overview above, and described briefly in the discussion of the wearable computing system 100 of FIG. 1 in connection with the sensor 122, a given HMD can, in accordance with an example embodiment, determine its location and FOV pointing direction from one or more sensors of the HMD, and can transmit the determined location-orientation information to a server in a network. And in further accordance with the example embodiment, a server can collect respective location-orientation information from a plurality of HMDs, and analyze the collected information to determine one or more "regions of interest" in three-dimensional space upon which the gazes of multiple HMS are, or appear to be, focused. The identification and analysis of such regions of interest—e.g., how many HMDs have or appear to have their respective gazes focused upon a particular region, the proximity to each other of HMDs that are or appear to be focused on a common region, how closely different gazes intersect a given point, the identification of a physical object within an identified region of interest, to name a few aspects that may be part of, or discovered from, analysis—can form the basis of various network-based applications and services, as well as be provided to HMDs as input to HMD-based applications and services.

Alternatively or additionally, an HMD can transmit its determined location-pointing direction to one or more other HMDs, either directly or via a network. In such an arrangement, multiple HMDs may share respective location-point direction information with each other, and individually and/or collectively (e.g., in a distributed manner) carry out the analyses described above as being carried out by the server. For purposes of illustration herein, discussion of collection and analysis of collective gaze information from multiple HMDs will be restricted a server-based implementation, unless otherwise noted. There is no loss in generality with respect to HMD-based collection and analysis, however, and it will be appreciated therefore that a HMD-based implementation of collective-gaze analysis is possible as well.

Example embodiments of determining, analyzing, and utilizing collective gaze from multiple HMDs may be described in operational terms with respect to actions carried out by one or more HMDs having communicative connections with one or more servers or server systems, and actions carried out by the one or more servers or server systems. Example operational descriptions are discussed in the following four subsections.

a. Local Coordinates and Intersecting Gaze Paths

In accordance with an example embodiment, the location-orientation information of a given HMD includes a location of the HMD and a gaze direction (the time at which location and gaze direction can also be determined). The location may be measured in any suitable coordinate system. For example, the location may be measured as geographic (or geodetic) latitude, longitude, and altitude (i.e., height above a reference height, such as sea level). As noted, the location could be determined by a GPS device or other sensor of the HMD. The gaze direction may be measured as an altitude angle with respect to a local (at the location of the HMD) horizontal plane, and an azimuthal angle measured about a vertical axis and with respect to a reference direction, such as North. In practice, a local horizontal plane can correspond to a plane that is tangent to the sphere of the Earth (or to a geodetic reference sphere) at the location of the HMD; the vertical axis could then be perpendicular to the horizontal plane at the HMD's location. It will be appreciated that other precise definitions, depending for example on particular geodetic reference models, could be applied. The gaze direction could be determined, for example, using one or more accelerometers to measure the altitude angle and a one or more magnetometers (e.g., a magnetic compass) to measure the azimuth angle. As discussed above, the devices could be part of an AHRS.

In order to determine if two or more gaze directions intersect or nearly intersect, each of the two or more gaze directions may be rendered geometrically as lines in three-dimensional space with respect a common frame of reference, whereby intersections, or near intersections, may be evaluated analytically. (Examples of the meaning of near intersection will be discussed below.) In practice, geometrically rendering gaze directions with respect a common frame of reference may involve one or more coordinate transformations, since each gaze direction may be measured with respect to a different local reference frame (e.g., that of the respective HMD), which may in turn be different from the common frame of reference. Such transformations may be accomplished according to known analytical methods, and may depend on the size of the geographic area over which the two or more HMDs being considered are spread.

For example, for two or more HMDs within a sports stadium, the common frame of reference may be adequately approximated as a rectangular grid of coordinates x, y, and z, with an origin at a given point on the sports playing field. Each coordinate transformation could then just be a simple spatial translation. For two or more HMDs separated by a continent (e.g., East and West coasts of North America), the Earth's curvature may need to be considered, and the coordinate transformation could involve a transformation of locally-referenced gaze direction to a celestial coordinate system (e.g., an astronomical coordinate system), again according to known analytical methods. Other types of transformations could be used as well.

Figure 5:
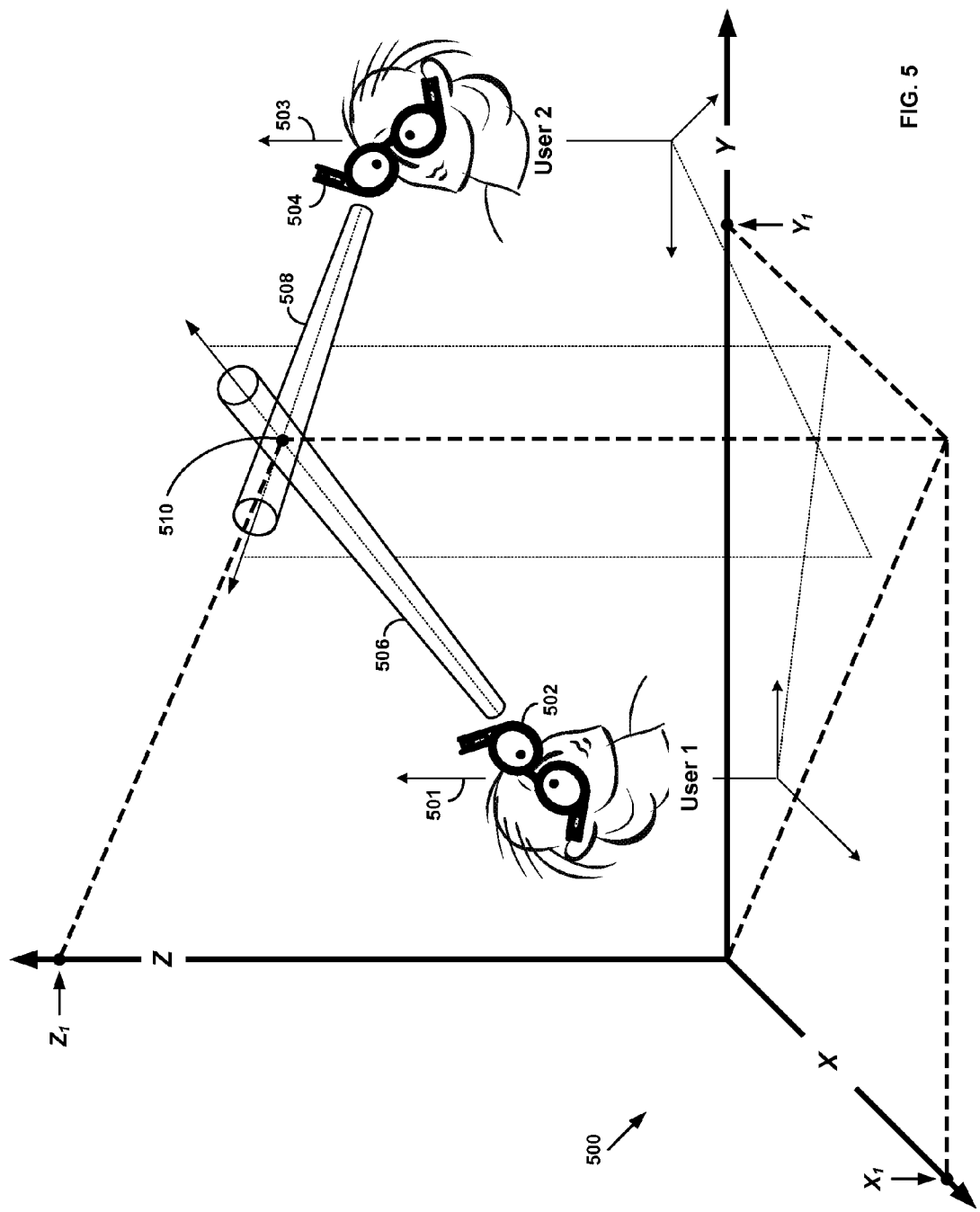
FIG. 5 illustrates an intersection of two field-of-view pointing directions, according to an example embodiment.

FIG. 5 illustrates an example of the intersection of two gazes within a common frame of reference 500, which by way of example is defined according to orthogonal axes X, Y, and Z, as indicated. In the figure, user 1 with a local reference frame 501 is wearing an HMD 502 and is gazing in a gaze direction 506. As also shown, user 2 with a local reference frame 503 is wearing an HMD 504 and is gazing in a gaze direction 508. The two gaze directions are shown to intersect at intersection point 510, which has coordinates $X=X_1, Y=Y_1$, and $Z=Z_1$ in the common frame of reference 500, as indicated. In this example, the coordinates of the intersection point could be determined by translating each of the gaze directions 506 and 508 from their respective local reference frames 501 and 503 into the common frame of reference 500.

Each of the gaze directions 506 and 508 is represented in FIG. 5 as a truncated cone (a "frustum") that opens outward from the respective HMD. This representation is intended to suggest that while a single pointing direction may be associated with a gaze direction, the viewing area about this pointing direction in the display will correspond to an increasing projected area with increasing distance from the HMD. For a generalized viewing area represented by a circle (or an ellipse), for example, the outward increase in projected area thus yields a cone-shaped viewing column, wherein the axis of the cone may be taken as the pointing direction.

The conical shape of the gaze directions 506 and 508 also suggests the intersection of the gaze directions may occur over a region, rather than at a single point. As such, the intersection point 510 might be interpreted as corresponding to a location of intersection volumes of the two viewing cones associated with the gaze directions 506 and 508. This illustrates one aspect of the concept of near intersection. In addition, while the intersection point 510 appears to mark an intersection of an axis of each of the gaze directions 506 and 508, the respective viewing cones could only partially intersect, even if their respective axes do not.

In practice, the generalized viewing area (e.g., a circle or an ellipse) could correspond to one or more specifically-defined viewing areas, although it should be understood that embodiments described herein are not limited to a specific definition of viewing area. By way of example, a specifically-defined viewing area could correspond to the field-of-view (FOV) of the HMD, and be rectangular in shape (instead of circular). In this case, the gaze direction 506 and/or 508 in FIG. 5 might have rectangular cross-section and a pointing direction corresponding to the pointing direction of the HMD itself. The gaze direction could be determined largely or entirely by an AHRS of the HMD (e.g., the sensor 122 in FIG. 1a).

Alternatively or additionally, the viewing area could correspond to a FOV of a user's or wearer's eye (or eyes), and be circular (or elliptical) in shape, as depicted by gaze directions 506 and 508. A typical opening angle of the FOV of a human eye is roughly 155° in a horizontal direction and 135° in a vertical direction, while the fovea of the human eye—the central region responsible for sharp central vision—is approximately 2° in both the horizontal and vertical directions. These values are examples and should not be viewed as limiting with respect to embodiments herein. In this case, the gaze direction 506 and/or 508 could include both the pointing direction of the HMD and the pointing direction of the user's or wearer's eye (or eyes) within the FOV of the HMD. The pointing direction of the HMD could again be determined by an AHRS of the HMD, while, in accordance with the example embodiment, the HMD could further include a device for tracking the pointing direction of the eye pupil (or pupils) of the user in order to determine the pointing direction of the user's or wearer's eye (or eyes) within the FOV of the HMD. Thus, the pupil tracking information could be added to pointing direction of the HMD to yield a more accurate or more refined indication of gaze direction of the user.

While the alternative example definition of viewing area explicitly involves a user or wearer of the HMD (i.e., a user's eyes), the term "gaze direction" will be used herein with reference to an HMD, as for example in the phrase "the gaze direction of an HMD." However, it should be understood that a gaze direction determined, measured, or reported by an HMD could include components beyond just the pointing direction of the HMD itself, and that the embodiments described herein are intended to apply to various forms of gaze direction, such as the two exemplified above.

Continuing with the discussion of FIG. 5, the vertical axes of local reference frames 501 and 503 may be taken as the respective local z-axes. In each local reference frame 501 and 503, a vertical plane containing the respective gaze direction 506 and 508 is depicted by a pair of thin dotted lines, one drawn vertically downward from the tip of the respective gaze-direction arrowhead, and the other indicating the intersection of the respective vertical plane with the horizontal plane of the respective local reference frame. The angle of the intersecting line in the horizontal plane of the respective local reference frame, measured with respect to a reference direction (e.g., the x-axis) corresponds to the respective (local) azimuthal angle. The angle between the respective gaze direction and the horizontal plane of the respective local reference frame corresponds to the respective (local) altitude angle.

In accordance with the example embodiment, each of HMDs 502 and 504 could transmit their respective location-orientation information to a server, such as server system 310 in FIG. 3, which could carry out the necessary analysis to identify and locate the intersection point 510. The respective location-orientation information could also include respective time stamps, which could be used in the analysis to determine a degree of concurrency of the two gaze directions, for example.

b. Regions of Intersection and Near-Intersection

As illustrated by way of example in FIG. 5, the respective axes of the gaze directions 506 and 508 of HMDs 502 and 504 appear to exactly intersect, in a mathematical (geometric) sense. In practice two or more gazes could be directed toward a common region or object or viewable event in that region, while not exactly intersecting, but rather "nearly" intersecting. The meaning of "near intersection" or "nearly intersecting" can be made quantitative in a number of ways. As noted above, one meaning of near intersection can derive from the intersection or overlap of respective viewing cones associated with multiple gaze directions. However, even considering gaze direction as being a singular path or ray, such as the axis of a viewing cone, quantitative meaning can still be given to "near intersection" and "nearly intersecting." Three example techniques for doing so are illustrated in FIGS. 6a, 6b, and 6c.

Pairwise Near Intersection

Figure 6A:
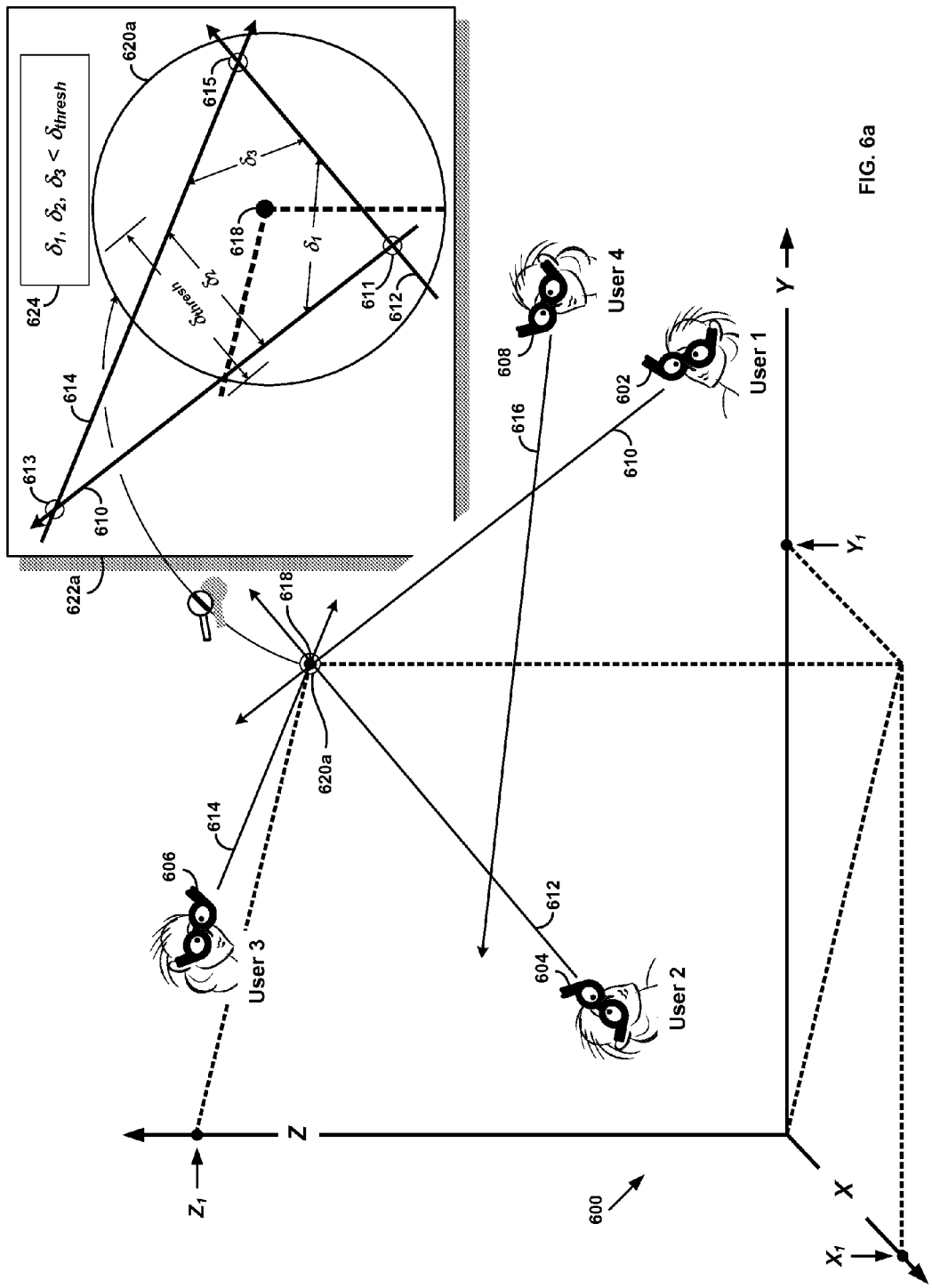
FIG. 6a illustrates one technique for determining near intersection of three field-of-view pointing directions, according to an example embodiment.
Figure 6B:
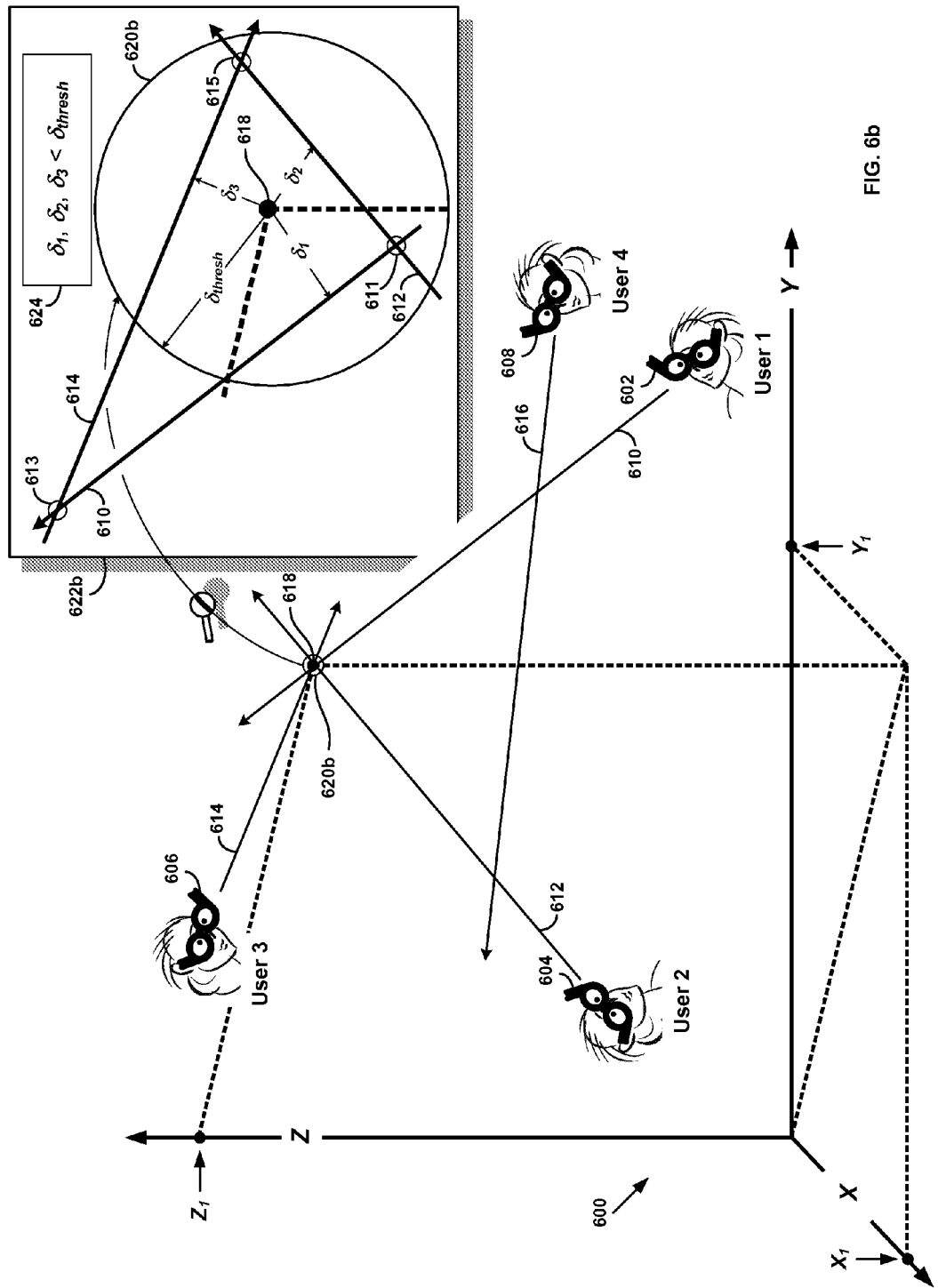
FIG. 6b illustrates another technique for determining near intersection of three field-of-view pointing directions, according to an example embodiment.
Figure 6C:
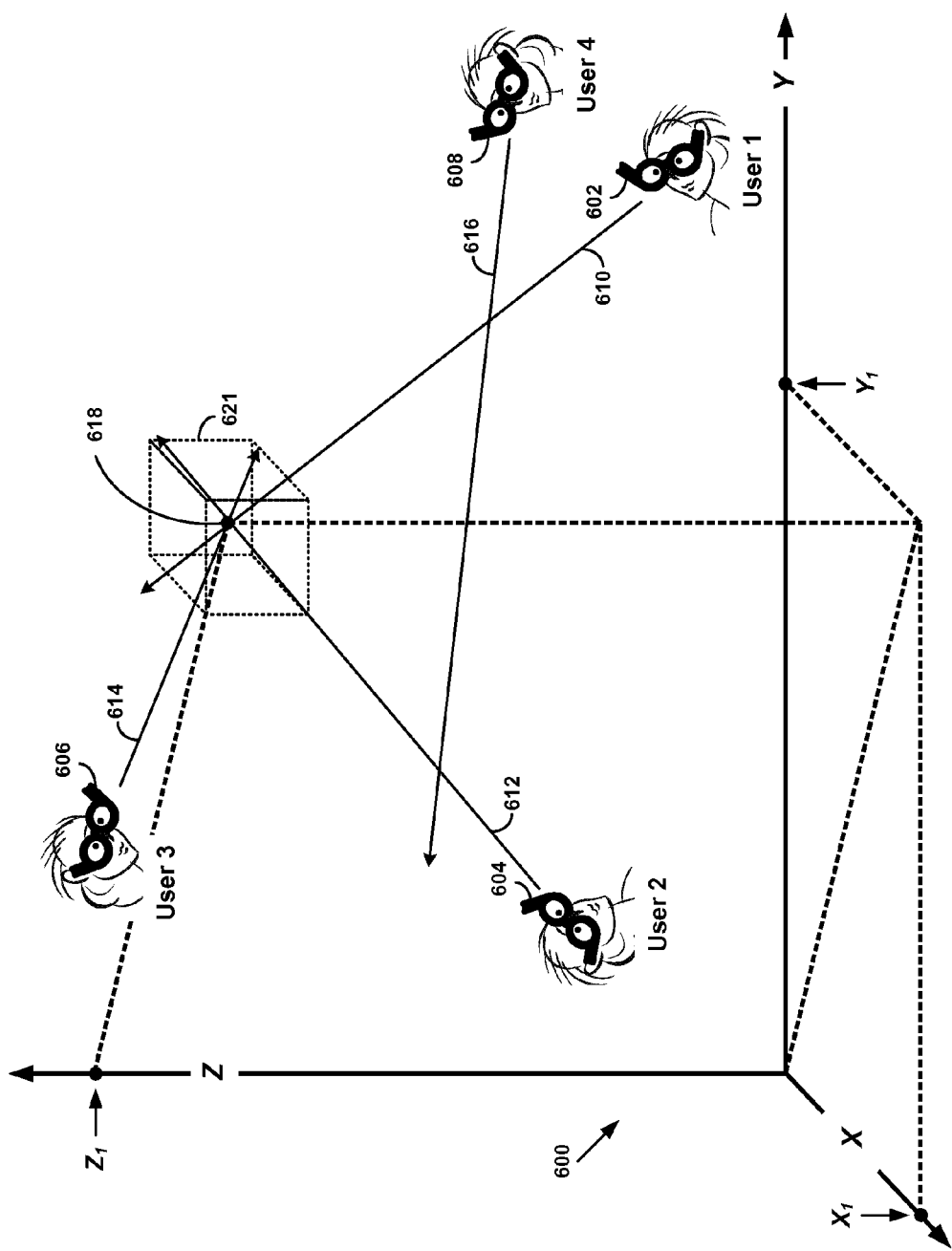
FIG. 6c illustrates still another technique for determining near intersection of three field-of-view pointing directions, according to an example embodiment.

A first example technique is illustrated in FIG. 6a, which depicts four users, user 1, user 2, user 3, and user 4 at locations measurable with respect to a common reference frame 600, defined, by way of example, according to orthogonal axes X, Y, and Z, as indicated.

In the illustration, user 1 is wearing a HMD 602 and is gazing along a gaze direction 610, user 2 is wearing a HMD 604 and is a gazing along gaze direction 612, user 3 is wearing a HMD 606 and is gazing along a gaze direction 614, and user 4 is wearing a HMD 608 and is gazing along a gaze direction 616. For brevity in the figure, local reference frames of the four users are omitted, and the gaze directions are represents simply as arrows. For example, each of the gaze directions could correspond to the axis of a view cone. Accordingly, each gaze direction in FIG. 6a could have a corresponding FOV, as described in connection with the cone-like representations of the gaze directions in FIG. 5.

By way of example in FIG. 6a, the gaze directions 610, 612, and 614 appear to intersect at the intersection point 618. Also by way of example, the gaze direction 616 does not appear to intersect at or even pass near the intersection point 618. The intersection point 618, evidently has coordinates $X=X_1, Y=Y_1$, and $Z=Z_1$ in the common reference frame 600, as indicated (not necessarily the same $X_1$, $Y_1$, and $Z_1$ as in common reference frame 500 of FIG. 5).

An enlarged view of the region around the intersection point 618 shows that the gaze directions 610, 612, and 614 don't exactly intersect, but rather nearly intersect in a quantifiable manner, as presently explained. A circle 620a around the intersection point 618 in the common reference frame 600 is shown in a magnified view in the upper right of FIG. 6a. A curved arrow passing under an icon of a magnifying glass points to the enlarged rendering of the circle 620a in the inset 622a, in which the magnified circle 620a is seen to be centered on the intersection point 618.

In order to better understand the illustration, the magnified circle 620a (as well as the unmagnified view) should be considered a two-dimensional projection of a spherical figure, and the area enclosed a two-dimensional projection of the enclosed spherical volume. With this understanding, it may also be appreciated that while the gaze directions 610, 612, and 614 appear to lie in the plane of the inset 622a, they should rather be considered as possibly having components out of the plane as well. In particular, the apparent pairwise intersections in the plane of the inset 622a of the three gaze directions—i.e., apparent intersection 611 of gaze directions 610 and 612; apparent intersection 613 of gaze directions 610 and 614; and apparent intersection 615 of gaze directions 612 and 614—are just projected intersections. For the purposes of the present illustrative discussion, it should be assumed that the three gaze directions do not exactly intersect. Instead, each pair has a distance of closest approach that quantifies how nearly the pair comes to intersecting.

As shown in the figure, gaze directions 610 and 612 come within $\delta_1$ of intersecting. Similarly, gaze directions 610 and 614 come within $\delta_2$ of intersecting, and gaze directions 612 and 614 come within $\delta_3$ of intersecting. Also as shown (and indicated in box 624), $\delta_1$, $\delta_2$, and $\delta_3$ are all smaller than a threshold distance $\delta_{thresh}$. Note that $\delta_1$, $\delta_2$, and $\delta_3$ are viewed as projected onto the plane of the inset 622a, and each may have spatial components out of the plane. With this geometrical description, the near intersection of the three gaze directions 610, 612, and 614 can be defined quantitatively to mean that each of pair of the three gaze directions passes within a threshold distance ($\delta_{thresh}$ in the present example) of the intersecting. In addition, the near intersection of each pair falls within a common volume of space, which in the present example corresponds to a spherical volume represented by the circle 620a. The volume of space within which the near intersection occurs may thus be considered a region of near intersection. A point in space marking a location of the region of near intersection—i.e., the center point 618 of the sphere in the present example—can then be taken as the point of near intersection.

In accordance with the example embodiment, each of the HMDs 602, 604, 606 and 608 could transmit their respective location-orientation information to a server, such as server system 310 in FIG. 3, which could carry out the necessary analysis to identify and locate the region of near intersection and the near intersection point 618 (and excluding the gaze direction 616 for missing the intersection point). The analysis could include the determination of a near intersection according the definition explained in connection with FIG. 6a. As with the example of FIG. 5, the respective location-orientation information could also include respective time stamps, which could be used in the analysis to determine a degree of concurrency of the four gaze directions, for example.

Near Intersection with a Common Point

A second example technique for determining near intersection is shown in FIG. 6b, which depicts the same situation of HMDs, users, and gaze directions as in FIG. 6a, but illustrates a different application of a threshold distance. In FIG. 6b, a circle 620b around the intersection point 618 in the common reference frame 600 is shown in a magnified view in the inset 622b. In accordance with the second technique, the magnified circle 620b shown in the inset 622b is seen to be centered on the intersection point 618 and to have a radius of $\delta_{thresh}$. Each of the gaze directions 610, 612, and 614 can be seen in the inset 622b to pass within $\delta_{thresh}$ of the intersection point 618. By way of example, gaze direction 610 passes the intersection point 618 at a minimum distance of $\delta_1$, gaze direction 612 passes the intersection point 618 at a minimum distance of $\delta_2$, and gaze direction 614 passes the intersection point 618 at a minimum distance of $\delta_3$. As indicted, in box 624, each of $\delta_1$, $\delta_2$, and $\delta_3$ is less than $\delta_{thresh}$.

In the second technique illustrated in FIG. 6b, the near intersection of the three gaze directions 610, 612, and 614 is determined with respect to a common point, which is intersection point 618 in the present example. The near intersection point 618 can therefore be defined quantitatively to mean that each of three gaze directions passes within a threshold distance ($\delta_{thresh}$ in the present example) of the intersection point. This definition can be extended to apply to any two or more gaze directions with respect to a given intersection point.

As with the description of FIG. 6a, the circle 620b may be considered a two-dimensional projection of a sphere of radius $\delta_{thresh}$ (or some other threshold distance), and the area enclosed a two-dimensional projection of the enclosed spherical volume.

As in the first example technique illustrated in FIG. 6a, each of the HMDs 602, 604, 606 and 608 in FIG. 6b could transmit their respective location-orientation information to a server, such as server system 310 in FIG. 3, which could carry out the necessary analysis to identify and locate the intersection point 618 (and excluding the gaze direction 616 for missing the intersection point). The analysis could include the determination of a near intersection according the definition explained in connection with FIG. 6b. Again, the respective location-orientation information could also include respective time stamps, which could be used in the analysis to determine a degree of concurrency of the four gaze directions, for example.

Voxel Intersection

A third example technique for determining near intersection is shown in FIG. 6c, which again depicts the same situation of HMDs, users, and gaze directions as in FIGS. 6a and 6b, but illustrates the use of somewhat different criteria for determining near intersection within a region of space. In the third technique, a volume of space large compared with locales within which near intersections are considered is taken to be subdivided into multiple smaller volumetric regions. The volumetric regions may be uniform and contiguous, such as regularly-arrayed cubes. In analogy with a subdivision of virtual three-dimensional space used in three-dimensional graphics applications, for example, the volumetric regions of the third technique are referred to as "voxels."

In FIG. 6c, a single voxel 621 is depicted at the location 618, which could be the geometric center of the voxel, for example. As shown for illustrative purposes, all three of the gaze directions 610, 612, and 614 intersect with the voxel 621. Although not necessarily apparent from the figure, it may be that none of the gaze directions 610, 612, and 614 actually intersect with each other. However, their respective intersections with the voxel 621 is taken to qualify the voxel location 618 as a near intersection point, and the voxel 621 as a region of near intersection. In this third technique, then, the near intersection of two or more gaze directions is define quantitatively as the respective intersection of each of two or more gaze directions with a common voxel. The intersection of a gaze direction with a voxel could also encompass intersection of a just a portion of a view cone with voxel, even if the axis of the view cone does not intersect the voxel.

As in the first and second example techniques illustrated in FIGS. 6a and 6b, each of the HMDs 602, 604, 606 and 608 in FIG. 6c could transmit their respective location-orientation information to a server, such as server system 310 in FIG. 3, which could carry out the necessary analysis to identify and locate the intersection point 618 as the location of the voxel 621. Again, the respective location-orientation information could also include respective time stamps, which could be used in the analysis to determine a degree of concurrency of the four gaze directions, for example. Note that the second example technique could be considered a special case of the third example technique in which voxels are spheres of radius of $\delta_{thresh}$. More generally, $\delta_{thresh}$ may be taken to be the dimensional size of a voxel (e.g. the length along the edge of a cubic voxel), or a metric thereof.

For purposes of the discussion herein, and in view of the quantitative definitions of near intersection that may be applied in accordance with the example embodiments, the terms "intersection" and "intersecting" will be taken to mean exact and/or near intersection in the sense described above, when referring to gaze directions, FOV pointing direction, or the like, unless otherwise noted.

c. Regions of Interest and Collective Gaze Maps

The intersection of the gaze directions of two or more HMDs could indicate that the respective users or wearers of the HMDs have focused their visual attentions on a region of the intersection. It could also be the case, however, that some or all of the users or wearers of the respective HMDs are gazing in the general direction of the region, but not necessarily focused on the region itself (e.g., focal points could be in front of the region, behind the region, to a side of the region, etc.), in which case some or all of the gaze directions may intersect by chance. The degree to which the identified intersections within a region of intersection are not merely fortuitous can provide one measure of the significance of the region. There could be other measures of significance as well. For example, a particular region could be known to contain an object or event that is likely to be worthy of drawing attention.

A region of intersection may also be considered what is referred to herein as a "region of interest," whereby the "level of interest" depends on one or another measure of the significance of the region. In accordance with an example embodiment, collective location-orientation information that, upon analysis by a server or server system, indicates one or more regions of intersection of a plurality of HMDs may also be used by the server or server system to determine the level of interest of the region.

More particularly, a weighting value indicative of significance may be assigned to a region of intersection, whereby the higher the weighting value, the higher the level of interest of that region, and vice versa. The weighting value assigned to a region of intersection of gaze directions of a plurality of HMDs can be determined based on one or more factors, including without limitation: the number of HMDs in the plurality (e.g., number of intersecting gaze directions), the size of the threshold distance used to quantify near intersection within the region of intersection, the size of the region of intersection, the proximity of the HMDs of the plurality to one another (or the size of an area containing the plurality of HMDs), the distance between the region of intersection and one or more of the HMDs of the plurality, the identification of an object and/or event within the region of intersection, comparison of time stamps of the respective location-orientation data from the HMDs of the plurality, and a respective identity associated with each of one or more of the plurality of HMDs. As described below by way of example, one or more of these factors could be taken as a direct indicator of a quantitative and/or qualitative significance of a region of intersection. Additionally or alternatively, one or more of the factors could be used in a statistical model to compute a statistical significance of the region.

Figure 6D:
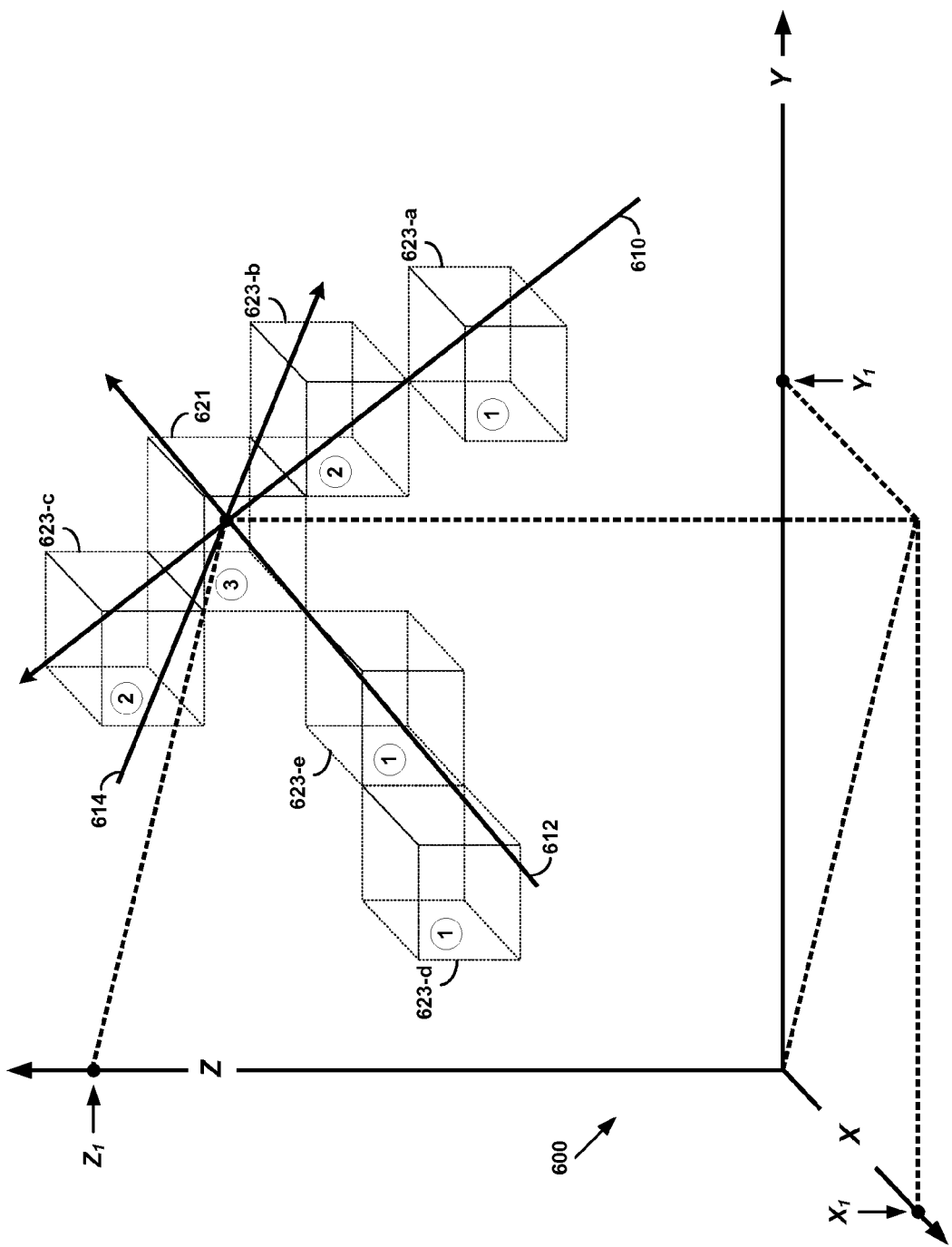
FIG. 6d illustrates additional details relating to the technique shown in FIG. 6c, according to an example embodiment.

One approach to identification of regions of interest and assignment of weighting values according to number of gaze intersections can be implemented using the voxel technique described above. This approach is illustrated in FIG. 6*d*, which depicts the same situation of gaze directions and voxel intersection as in FIG. 6*c*, but with additional, representative voxels of a three-dimensional array of voxels included in the figure. Also, for the sake of brevity in the figure, explicit depiction of the HMDs and the users is omitted, as is the non-intersecting gaze direction 616.

In FIG. 6*d*, in addition to intersecting with the voxel 621, each of the gaze directions 610, 612, and 614 is shown (by way of example) to intersect with one or more of voxels 623-*a*, 623-*b*, 623-*c*, 623-*d* and 623-*e*. For example, the gaze direction 610 is shown to additionally intersect with voxels 623-*a*, 623-*b*, and 623-*c*. Similarly, the gaze direction 612 is shown to additionally intersect with voxels 623-*d* and 623-*e*; and the gaze direction 614 is shown to additionally intersect with voxel 623-*c*. It will be appreciated that the depicted voxels 621, 623-*a*, 623-*b*, 623-*c*, 623-*d* and 623-*e* could be part of a larger three-dimensional array of voxels, the full set of which is not shown in FIG. 6*d* to avoid overcrowding the illustration.

Each voxel in FIG. 6*d* is also marked with a circled number, which represents the number of gaze directions that intersects the voxel. For example, the voxel 623-*a* is intersected only by gaze direction 610, and accordingly is marked with the number one ("1" in a circle). Continuing with the example, the voxels 623-*b* and 623-*c* are each intersected by the gaze directions 610 and 614, and accordingly each is marked with the number two ("2" in a circle). The voxels 623-*d* and 623-*e* are each intersected only by gaze direction 612, and accordingly each is marked with the number two ("1" in a circle). Finally, the voxel 621 is intersected by all three gaze directions 610, 612 and 614, and accordingly is marked with the number three ("3" in a circle).

In accordance with an example embodiment, the respective number of gaze intersections with each voxel could thus be used as the weighting value for the voxel. For the illustrated example, voxel 621 could be identified as a region of interest, since it has the highest weighting value. The voxels 623-*b* and 623-*c* might also rank some degree of interest, although less so than the voxel 621. It will be appreciated that many of the voxels omitted to avoid overcrowding in the figure to might not be intersected by any of gaze directions 610, 612, or 614 in the present example, and could therefore have weighting values of zero.

The number of gaze intersections with a voxel may also depend on the size of the voxel, which can be chosen to impose a degree of precision for identifying near intersections of analyzed gaze paths. Size consideration can similarly be applied to the threshold distance of the first and second techniques described above. The smaller the threshold distance and/or the voxel size, the higher the precision and the higher the significance of any identified intersections, and vice versa. If the threshold distance or voxel size is chosen too small, however, the analysis might exclude most or all possible near intersections; if it is chosen too large, the analysis might include a relatively large number of chance or fortuitous near intersections. Accordingly, the analysis could be carried out by iteratively adjusting the threshold size or voxel size, and assigning different threshold-based weighting values to regions of intersection determined at each iteration. For example, the weighting value could be computed as an inversely-increasing function of threshold size or voxel size.

In accordance with the example embodiment, the size of the threshold distance or voxel size could also be chosen based on other factors, such as a determination that the HMDs of the analysis are located in a common venue or at a common event. For instance, if all of the HMDs are located at a football stadium, a voxel size of two meters might be chosen for determining which HMDs are gazing toward the football. As another example, a threshold distance or voxel size of 0.25 kilometers might be used for determining if HMDs in a city are gazing toward a parade. Other examples are possible as well.

By considering both the number of gaze intersections and voxel (or threshold distance) size, a number density within the region could be computed, whereby the larger the density, the higher the significance, and vice versa. Accordingly, the weighting value could be computed as an increasing function number or number density.

In further accordance with the example embodiment, by computing the weighting value according to number density, a form of weight-value gradient could also be determined. For example, the gradient could indicate a rate at which number density drops off with distance from the location of the region of intersection (e.g., from a given voxel). The presence of a measurable gradient might be a further indicator of significance, since random intersections of gaze paths might give rise to a diffuse number density with little or no discernible gradients.

An example application of gradients is a graphical representation in the form of a three-dimension collective gaze map (or grid). Taking weighting value as a conceptual analog of temperature, the collective gaze map can also be considered a sort of three-dimension "heat" map, whereby the higher the weighting value the higher the temperature, and vice versa.

Figure 7:
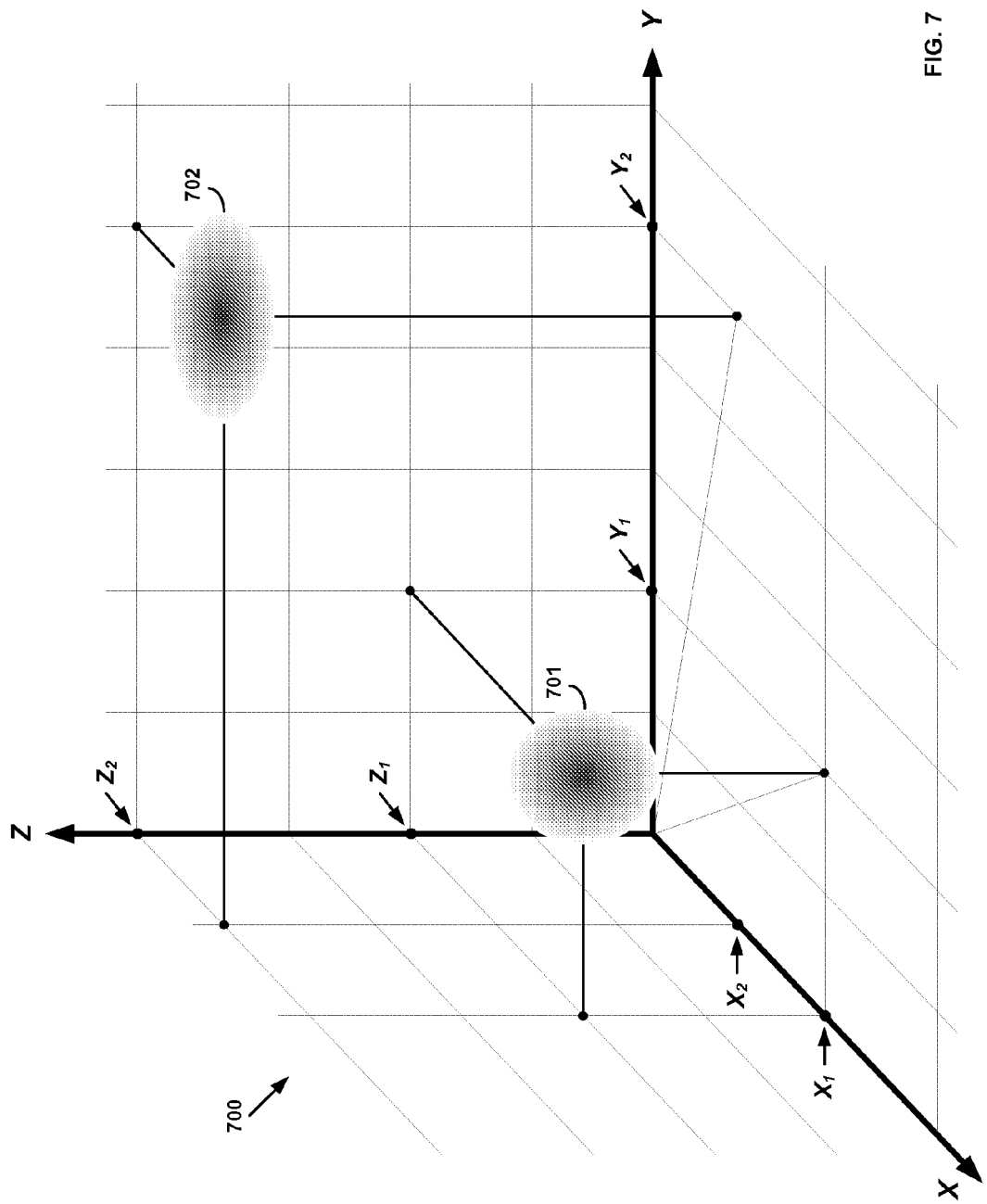
FIG. 7 is an illustrative representation of a collective gaze map, according to an example embodiment.

FIG. 7 illustrates an example heat map showing two regions of intersection (or regions of interest) 701 and 702 at locations measurable with respect to a reference frame 700, which by way of example is defined according to orthogonal axes X, Y, and Z, as indicated. In the figure, region 701 is located at $X=X_1, Y=Y_1$, and $Z=Z_1$ in the reference frame 700 (not necessarily the same $X_1, Y_1$, and $Z_1$ as in common reference frame 500 of FIG. 5 or 600 of FIG. 6*a*, 6*b*, 6*c*, or 6*d*), and region 702 is located at $X=X_2, Y=Y_2$, and $Z=Z_2$. Each region is depicted as ellipsoid, and shaded with a gray scale representing "temperature" variations. More particularly, the shading is darkest near the center of each region, where the weighting value is highest, and becomes lighter with distance from the center as the weighting value decreases.

In further accordance with the example embodiment based on voxels, the number of gaze intersections with each voxel of a three-dimensional, regular array of fixed-sized voxels (e.g., the circled numbers in FIG. 6*d*) could directly yield any gradient patterns that might be present in the location-orientation information of multiple HMDs. Moreover, since the number of intersections among a collection of voxels could be cast more generally as a number of "hits" among a collection of searchable items (voxels, in this case), collective location-orientation may be particularly suited to analysis using one or another efficient search technique, such as those used for network-based information searches, for example.

The heat map of FIG. 7 could be generated by the server or server system, and used by one or more applications at the server, and/or provided to one or more HMDs for use in an HMD-based application. For example, the heat map could be used for displaying regions of interest in the vicinity of a city, allowing a user to zoom in on or further analyze any of the regions. The user could, for instance, determine what object or event is the focus of apparent interest in any given region. As another example, a television broadcaster could use a heat map from within a sports arena to inform a local camera crew of regions of interest during a sporting event.

An HMD could use a heat map to project a visual cue onto the display to indicate a region of interest that lies within a current FOV. For example, an icon of a ball could be displayed at a position corresponding to an actual ball in play in a sports arena. As another example, a visual and/or audible cue could alert the wearer of the HMD to an event or location of interest, such as a street performance. Other HMD-based applications that make uses of a heat map.

In still further accordance with the example embodiment, the proximity of the HMDs of a plurality to one another (or the size of an area containing the plurality of HMDs) could be used as a sort of filter for including or excluding gaze directions in the analysis. For example, if the analysis is intended to apply to HMDs in a sports arena, HMDs beyond the arena can be excluded. If analysis is intended to apply to a city, then HMDs far beyond the city could be excluded.

Figure 8:
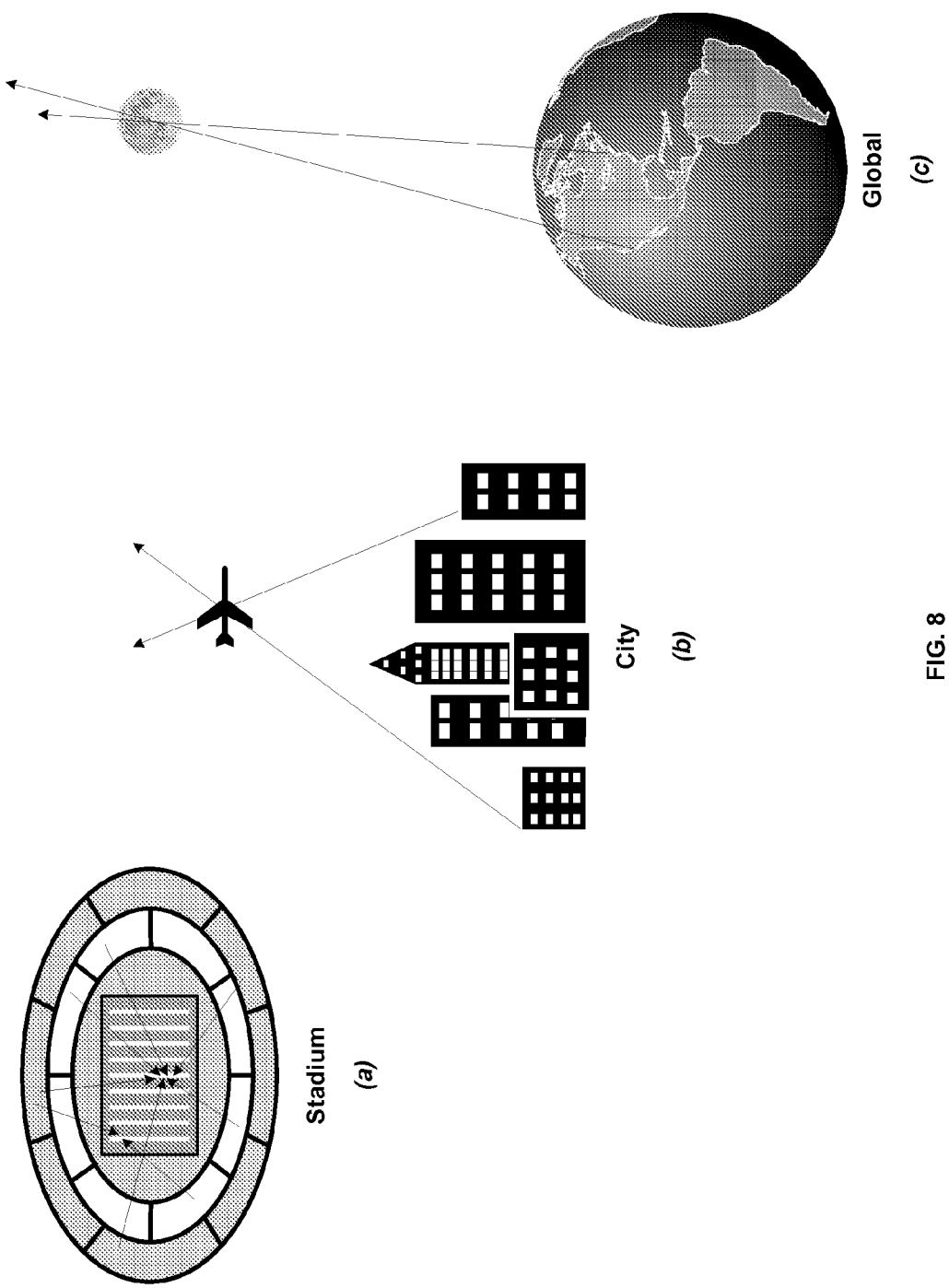
FIG. 8 depicts three example locales, (a), (b), and (c), of head-mounted displays having apparently intersecting field-of-view pointing directions, according to an example embodiment.

The proximity of the HMDs of the plurality to one another could be combined with the distance between an identified region of intersection and one or more of the HMDs of the plurality to help determine the significance of the region. This may be illustrated conceptually with reference to FIG. 8, which depicts three different locales containing respective pluralities of HMDs and corresponding regions of intersection, labeled "(a)," "(b)," and "(c)." Locale (a) is a sports arena, with seven gaze paths indicated by arrows. Five of the arrows are directed near the center of a playing field, and two are directed near a sideline of the field. Considering an analysis of HMDs in the arena, the respective distances between the HMDs and the two apparent regions of intersection would support the intersections as being significant.

Locale (b) is a city, with two gaze directions intersecting near an airplane. While there could be a random intersection gaze paths from among HMDs in a city, the identification of possible object of common focus (e.g., an airplane) could support identifying the intersection as significant. The distance between the HMDs and the airplane could lend additional support to the supposition of significance.

Locale (c) spans a continent, with gaze paths on each coast that apparently intersect each other on at a celestial object. In this case, the apparent intersection might still be significant given the distance between the HMDs and the object.

One or more of the above factors could be used in a statistical model to predict the likelihood of random or chance intersections of gaze paths among a given distribution of hypothetical HMDs. The model could be used to evaluate the statistical significance of actually identified intersections from among similarly distributed actual HMDs. Such an approach could help eliminate false detections or false identifications of intersections.

Time stamp information could also be used to filter data. For example gazes at disparate times from a particular event could be filtered out from an analysis seeking to identify gazers of that event. Time stamp information could also be used to collect or track gaze information over time, such as tracking viewing of a billboard advertisement, for example.

Identities associated with HMDs could also be used to filter data or help evaluate significance. For instance, multiple users could be engaged in an HMD-based augmented-reality game in which each user's HMD carries an identifier. Gaze data could be filtered based on the identifiers.

Other representation of collective gaze data could be devised as well, and could support other types of applications. For example, collective gaze data could be used to track and accumulate view statistics associated with a billboard or other form of public advertising. The statistics could then serve as input to a billing function for charging an advertiser, or for providing marketing feedback to the advertiser. Collective gaze data could also be used in applications relating to public safety, such as locating accidents, among others.

4. Example Methods

The example embodiments for determining regions of collective gaze of multiple wearable head-mounted displays described above in operational terms of can be implemented as methods on a server system and/or on a wearable HMD. Example embodiments of such methods are described below.

a. Example Method in a Server System

Figure 9:
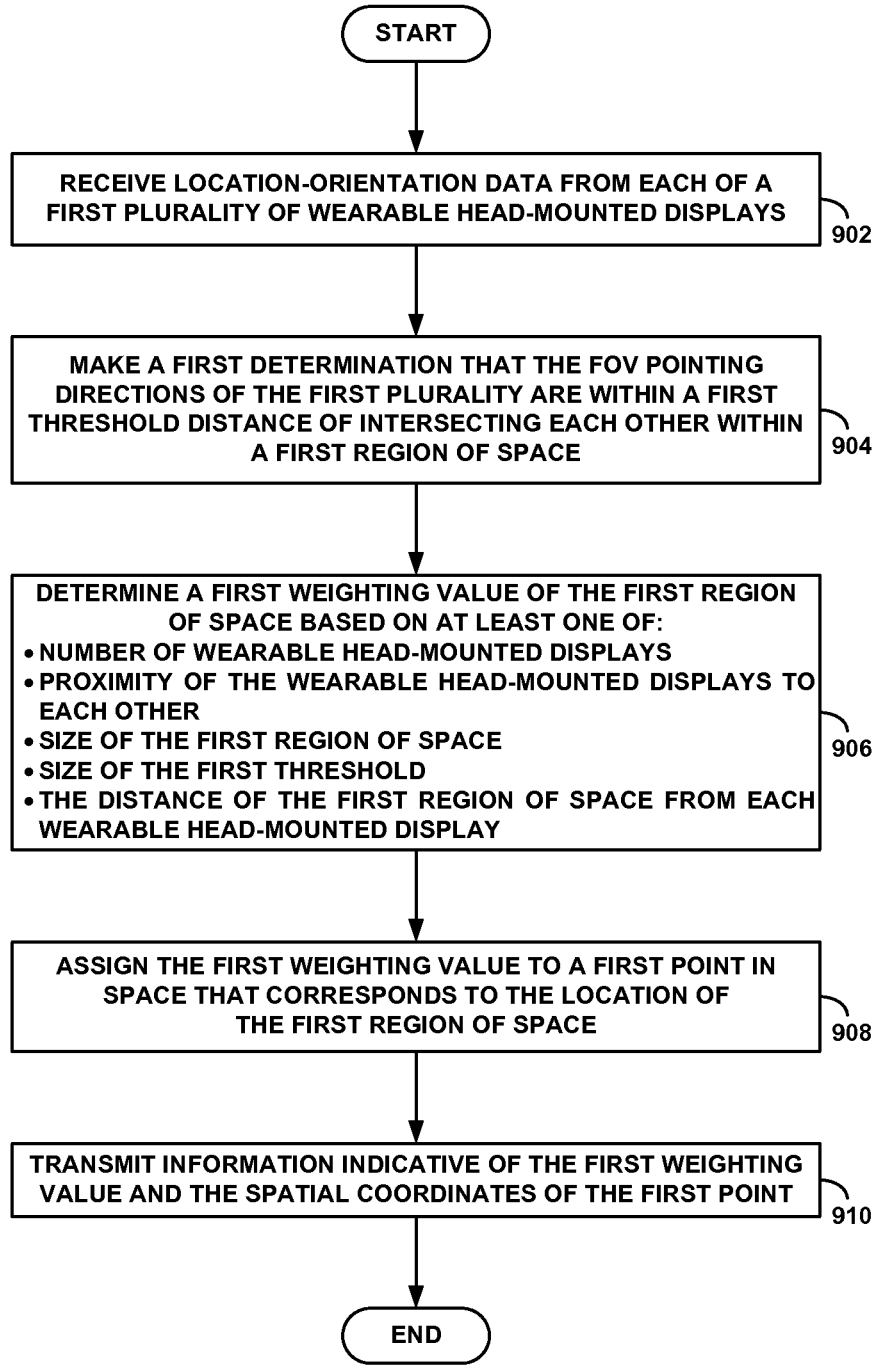
FIG. 9 is a flowchart illustrating an example embodiment of a method in a server system for determining regions of collective gaze of multiple wearable head-mounted displays.

FIG. 9 is a flowchart illustrating an example embodiment of a method in a server or server system (or other device) for determining regions of collective gaze of multiple wearable head-mounted displays. The illustrated steps of the flowchart could be implemented in the server system as executable instructions stored in one or another form of memory, and executed by one or more processors of the server system. Examples of a server system include the server system 310 in FIG. 3, the computing device 400 in FIG. 4*a*, and one or more groupings of the computing clusters 409*a*, 409*b*, and 409*c* in FIG. 4*b*. The executable instructions could also be stored on some form of non-transitory tangible computer readable storage medium, such as magnetic or optical disk, or the like, and provided for transfer to the server system's (or device's) memory during configuration or other procedure(s) for preparing the server system for operation.

As noted above, multiple HMDs may share respective location-point direction information with each other, and individually and/or collectively (e.g., in a distributed manner) carry out the steps described below as being carried out by the server. For purposes of illustration herein, however, the example method is described in terms of a server-based implementation.

As shown in FIG. 9, at step 902 the server system receives location-orientation data from each of a first plurality of wearable HMDs. By way of example, the server could be in, or connected to, a network, such as data network 302 in FIG. 3, and each of the first plurality of wearable HMDs could be communicatively connected to the server via one or more access networks, such as RAN 304 and wireless access network 306 in FIG. 3. As such, the server system could receive the respective location-orientation data transmitted from each wearable HMD via the network.

In accordance with the example embodiment, the respective location-orientation data for each HMD may include information indicative of a respective location and a respective field-of-view (FOV) pointing direction of the HMD. For example, the location information could correspond to geographic (or geodetic) latitude, longitude, and altitude determined from GPS coordinates. The FOV pointing direction, also referred to herein as the gaze direction, could correspond to an altitude angle measured at the location of the HMD with respect to a horizontal plane, and an azimuth angle measured at the location of the of the HMD with respect to a reference direction, such as geographic (or geodetic, or geomagnetic) North. In addition, the location-orientation data each HMD could include data indicating a respective time at which the information was determined or measured.

The FOV pointing direction of each wearable HMD could be determined by a measuring device on each HMD, such as an AHRS, or the like. In further accordance with the example embodiment, the FOV pointing direction could include information indicative of an eye-pointing direction of the user of the HMD. For instance, the HMD could include a camera or other detector for tracking the eye pupil(s) of the user or wearer or the HMD. Such information could be used to compute a more refined measure of FOV pointing direction.

At step 904, the server system makes a first determination that the respective FOV pointing directions of the wearable HMDs are within a first threshold of intersecting one another within a region of space, identified herein as a "first region of space" for purposes of the present discussion. The first determination corresponds to identification of a region of collective gaze of the first plurality of the wearable HMDs.

In accordance with the example embodiment, the identifying action could be made by analyzing the location-orientation data from the first plurality of wearable HMDs. For example, the analysis could proceed by dividing three-dimensional space into volume elements (e.g., voxels) of size dimension characterized by the threshold distance. The first region of space could then correspond to a voxel that is intersected by the respective FOV pointing directions of the first plurality of wearable HMDs.

As another example, the analysis could identify a given point in three-dimensional space at which the FOV pointing directions come within the first threshold distance of intersecting. In this case, the first threshold distance can be considered the radius of a sphere centered on the given point, and the sphere would be considered a region of intersection (or near intersection) if two or more FOV pointing directions intersect the sphere's surface. It will be appreciated that other forms of analysis could be used to determine regions of intersection, and in particular the first region identified at step 904. For example, the analysis could be based on a triangulation of the gaze directions of the first plurality of wearable HMDs.

As still another example, it may be known that the first region contains or is the location of an object or event of interest, such as a landmark, performer, ball on a playing field, etc. In this case, apparent near-intersections could be reasonably assumed to be an actual region of intersection. Such a technique of identification could be analogous to a "snap-to" operation of graphical routing of lines or trajectories.

Continuing with FIG. 9, at step 906 the server system determines a first weighting value of the first region of space. In accordance with the example embodiment, the weighting value is determined based on at least one of the factors including: (i) the number of wearable HMDs in the first plurality, (ii) the size of a geographic region within which the wearable HMDs of the first plurality are located, (iii) the size of the first region of space, (iv) the size of the first threshold distance, and (v) the respective distance of the first region of space from each wearable HMD of the first plurality.

In accordance with the example embodiment, the first weighting value corresponds to a significance or importance of the first region of space with respect to its identification, by virtue being a focal point of collective gaze, as being a region of interest. Each of the listed factors may be considered as providing or indicating a measure of that importance or significance. For example, as the number of nearly-intersecting gazes in the first region increases, the significance or importance of the region may be considered to correspondingly increase, and vice versa. Accordingly, the first weighting value of the first region of space may be determined as an increasing function of the number of wearable HMDs in the first plurality.

Similarly, as the size of the first region decreases, or as the size of the first threshold distance decreases, the degree to which the nearly-intersecting gazes approach actual intersection increases. It may reasonably follow that the significance or importance of the region may be considered to increase in correspondence with a decrease in threshold distance, and vice versa. Accordingly, the first weighting value of the first region of space may also be determined as function that increases with decreasing size of the first region of space.

Similar rationales may be applied to using the other factors in determining the first weighting value. Thus, if the wearable HMDs of the first plurality are in close proximity to one another, the significance of their collective gazes nearly intersecting in the first region may be high. For example, the wearable HMDs of the first plurality may all be located in the same sports arena. In a related manner, the proximity of the wearable HMDs to the first region may also be used and indicator of the significance of the first region.

In further accordance with the example embodiment, determining the first weighting value of the first region of space could involve determining a statistical likelihood that the observed intersection of gazes in the first region is not merely a chance occurrence or coincidence. For example, a statistical model could be used to calculate the likelihood of random occurrences of gaze intersections from among a given number of users (e.g., wearers of HMDs) randomly placed in a given locale (e.g., a city) and gazing in random directions. The model could be used to evaluate the statistical significance an actually-identified region of near intersection of gazes, such as the first region identified at step 904. A higher weighting value could be determined for a higher statistical significance, and vice versa.

At step 908, the server system assigns the first weighting value to a first point in space that corresponds to the location of the first region of space. In accordance with the example embodiment, the first point could be coordinates in three-dimensional space indicative of the location of the first region. For example, a point at the center of a sphere that defines the first region, or at the center of a rectangular voxel that defines the first region. Assigning the first weighting value to the first point could create an association of the first weighting value with the first point, which association may be recorded in a table or other data structure in one or another form of memory of the server system.

Finally, at step 910, the server system transmits information indicative of both the first weighting value and spatial coordinates of the first point. For example, the information could be the recorded association between the first weighting value and the first point, or could be a table of multiple associations for multiple points and respective weighting values. In accordance with the example embodiment, transmitting the information indicative of both the first weighting value and spatial coordinates of the first point could include transmitting the table to one or more wearable HMDs (including wearable HMDs determined to be collectively gazing at or toward the first region, or possibly different ones as well or instead). Additionally or alternatively, transmitting the information indicative of both the first weighting value and spatial coordinates of the first point could include transmitting the information to another server, or to an application in the same server, for further processing.

In further accordance with the example embodiment, the server system can apply the method of steps 902-910 to a second plurality of wearable HMDs in order to determine a second region of collective gaze. By doing so repeatedly (e.g., for a third plurality, a fourth, and so on), the server system could generate the table of associations for multiple points in three-dimensional space. The table could also take the form (or be rendered as) a three-dimensional "collective gaze map." Such map could be used to visualize regions of interest distributed in the three-dimensional space covered within some defined region. The weighting value at each point in the map could be considered as representing a sort of "temperature." Furthermore, the different "temperatures" could be interpreted as gradient. Such a map is sometimes referred to as a "heat map."

Although not explicitly illustrated in FIG. 9, the example method could include one or another form of filtering of the location-orientation data prior to determining regions collective gaze for a heat map or other tabulation. For instance, the plurality of wearable HMDs could be selected initially based on proximity of the HMDs to each other, or based on an initial determination of nearly intersecting gaze directions in a selection region. Other selection criteria could include determining that the wearable HMDs of the plurality are located in a particular geographic area or venue, determination of a respective identifier of each wearable HMD of the plurality.

It will be appreciated that the steps shown in FIG. 9 are meant to illustrate operation of an example embodiment. As such, various steps could be altered or modified, the ordering of certain steps could be changed, and additional steps could be added, while still achieving the overall desired operation.

b. Example Method in a Wearable Computing System

Figure 10:
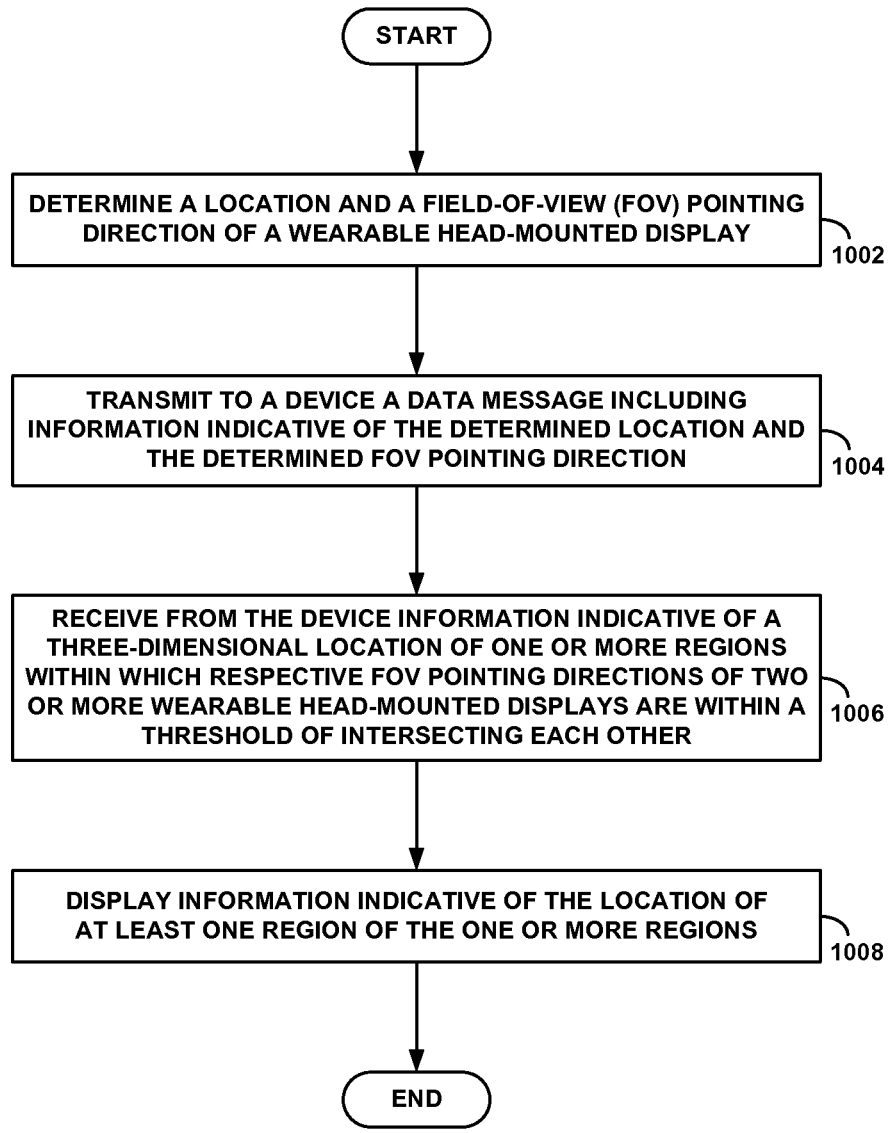
FIG. 10 is a flowchart illustrating an example embodiment of a method in a wearable head-mounted display for determining location and pointing direction information, transmitting the determined information to a server in network, and receiving information relating to collective gaze of multiple wearable head-mounted displays.

FIG. 10 is a flowchart illustrating an example embodiment of a method in a wearable computing system, such as a wearable HMD, for determining location and pointing direction information, transmitting the determined information to a server in network, and receiving information relating to collective gaze of multiple wearable head-mounted displays. The illustrated steps of the flowchart could be implemented in the wearable head-mounted display as executable instructions stored in one or another form of memory, and executed by one or more processors of the wearable head-mounted display. Examples of a wearable HMD include the wearable computing system 100 in FIG. 1 and the wearable computing system 202 in FIG. 2. The executable instructions could also be stored on some form of non-transitory tangible computer readable storage medium, such as magnetic or optical disk, or the like, and provided for transfer to the wearable head-mounted display's memory during configuration or other procedure(s) for preparing the wearable head-mounted display for operation.

As shown, at step 1002, the wearable HMD determines a location and FOV pointing direction. In accordance with the example embodiment, the location of the HMD could be determined as geographic (or geodetic) latitude, longitude, and altitude, measured using a GPS device of the HMD. For instance, referring momentarily to FIG. 1 again, the HMD could be part of the wearable computing system 100, and the GPS device could be part of the sensor 122 of the eyeglasses 102. Alternatively or additionally, the location of the HMD could be determined by triangulation in communications with two or more cellular radio transceivers (or other wireless access devices).

In further accordance with the example embodiment, the FOV pointing direction (or to gaze direction) could correspond to an altitude angle measured at the location of the HMD with respect to a horizontal plane, and an azimuth angle measured at the location of the of the HMD with respect to a reference direction, such as geographic (or geodetic, or geomagnetic) North. The gaze direction could be measured using an AHRS, also part of the sensor 122 of the eyeglasses 102 of FIG. 1.

In further accordance with the example embodiment, the FOV pointing direction could include information indicative of an eye-pointing direction of the user of the HMD. For instance, the HMD could include a camera or other detector for tracking the eye pupil(s) of the user or wearer or the HMD. Such information could be used to compute a more refined measure of FOV pointing direction.

At step 1004, the wearable HMD transmits to a device (such as a server in a data network) a data message including information indicative of the determined location and FOV pointing direction, as well as a time at which the measurements were made. The determined location and FOV pointing direction are what have been referred to above collectively as location-orientation information. The information could also include a time at which the location and FOV pointing direction are determined.

By way of example, the HMD could be in, or connected to, an access network, such as RAN 304, or wired access network 308 in FIG. 3, and the server could correspond to the servers system 310 connected to the access networks via the data network 302, also shown in FIG. 3. As such, the HMD could transmit the location-orientation data to the server via the connected (interconnected) networks, whereby the transmission link from the HMD to the access network could be wireless, wired, or both, depending on the particular access network used (cf. FIG. 3).

As another example, the HMD could be communicatively connected to one or more other HMDs, either directly (e.g., via Bluetooth, or the like) or via a wireless network. In this case, the HMD could transmit the location-orientation data to the one or more other HMDs.

At step 1006, the wearable HMD receives from the device (e.g., the server or another HMD) information indicative of a three-dimensional location of one or more regions of intersecting gaze directions. Referring momentarily to FIG. 9 again, the information received from the server could correspond to the information described as being transmitted from the server at step 910 of FIG. 9. As such, the information received from the server at step 1006 could include data representative of a three-dimensional collective-gaze map or heat map of a plurality of wearable HMDs. The HMD itself could be one of the plurality of wearable HMDs represented in the collective gaze map (or other form of information from the server), though not necessarily.

In accordance with the example embodiment, the information received from the server could additionally or alternatively include an indication of a physical object positioned within one of the one or more regions. Referring again to the example of multiple HMDs located within a football stadium, the information from the server could include an indication that the football is currently position within one of the one or more regions. Other examples discussed above apply as well.

Finally, as step 1008, the wearable HMD displays information indicative of at least one of the one or more regions of intersecting gaze directions. In further accordance with the example embodiment, the HMD could display a visual indicator in the display at two-dimensional display coordinates corresponding to the location as projected onto the display of one of the regions. Further still, the visual indicator could be a visual cue indicating the location of a real, physical object contained within the region, as projected onto the two-dimensional display as viewed by user or wearer of the HMD. Alternatively or additionally, the visual indicator could be displayed so as to appear to be located in and occupy a virtual three-dimensional space displayed in the HMD.

Although not explicitly shown in FIG. 10, the transmission of the location-orientation information at step 1004, or even the determination of the information at step 1002, could be subject to permission or authorization on the part of the user or wearer of the HMD. For example, a user or wearer of the HMD to choose not to allow the information to be transmitted to the server. The ability to opt out of transmission could ensure or facilitate user privacy, for example. Note that the user could still choose to receive and display the information from the server (e.g., steps 1006 and 1008).

It will be appreciated that the steps shown in FIG. 10 are meant to illustrate operation of an example embodiment. As such, various steps could be altered or modified, the ordering of certain steps could be changed, and additional steps could be added, while still achieving the overall desired operation.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. In a device, a computer-implemented method comprising:
   receiving respective location-orientation data from each of a first plurality of wearable head-mounted displays (HMDs), the respective location-orientation data including information indicative of a respective actual location and a respective actual field-of-view (FOV) pointing direction of each of the first plurality of wearable HMDs;
   making a first determination that the actual FOV pointing directions of the first plurality are within a first threshold distance of intersecting each other within a first region of actual space;
   determining a first weighting value of the first region of actual space based on at least one of (i) a number of wearable HMDs in the first plurality, (ii) a size of a geographic region within which the wearable HMDs of the first plurality are located, (iii) a size of the first region of actual space, (iv) a size of the first threshold distance, or (v) a respective distance of the first region of actual space from each wearable HMD of the first plurality;
   determining three-dimensional spatial coordinates of a first point indicative of a location of the first region of actual space, and assigning the first weighting value to the coordinates of the first point; and
   transmitting information indicative of the first weighting value and the coordinates of the first point.

2. The method of claim 1, wherein the device comprises a server system.

3. The method of claim 1, wherein the device comprises a wearable HMD.

4. The method of claim 1, further comprising:
   receiving respective location-orientation data from each of a second plurality of wearable HMDs, the respective location-orientation data including information indicative of a respective actual location and a respective actual FOV pointing direction of each of the second plurality of wearable HMDs;
   making a second determination that the actual FOV pointing directions of the second plurality are within a second threshold distance of intersecting each other within a second region of actual space;
   determining a second weighting value of the second region of actual space based on at least one of (i) a number of wearable HMDs in the second plurality, (ii) a size of a geographic region within which the wearable HMDs of the second plurality are located, (iii) a size of the second region of actual space, (iv) a size of the second threshold distance, or (iv) a respective distance of the second region of actual space from each wearable HMD of the second plurality; and
   determining three-dimensional spatial coordinates of a second point indicative of a location of the second region of actual space, and assigning the second weighting value to the coordinates of the second point.

5. The method of claim 4, wherein the first point and the assigned first weighting value and the second point and the assigned second weighting value comprise two data points of a three-dimensional collective gaze map.

6. The method of claim 5, wherein transmitting information indicative of the first weighting value and the coordinates of the first point comprises transmitting data representative of the three-dimensional collective gaze map to at least one wearable HMD of the first plurality.

7. The method of claim 1, wherein the respective actual location of each of the first plurality of wearable HMDs comprises a geographic location of each of the first plurality of wearable HMDs measured at a respective time,
   wherein the respective actual FOV pointing direction of each of the first plurality of wearable HMDs comprises an angular direction of a FOV axis of each of the first plurality of wearable HMDs measured at the respective time,
   and wherein receiving the respective location-orientation data from each of the first plurality of wearable HMDs comprises receiving a respective data message transmitted from each respective wearable HMD of the first plurality.

8. The method of claim 7, wherein the geographic location of each of the first plurality of wearable HMDs comprises a Global Position Satellite System location measurement,
   and wherein the angular direction of the FOV axis of each of the first plurality of wearable HMDs comprises data corresponding to both an altitude angle measured with respect to a horizontal plane, and an azimuth angle measured with respect to a geographic reference direction.

9. The method of claim 1, wherein making the first determination comprises determining that each respective actual FOV pointing direction of each wearable HMD of the first plurality is within the first threshold distance of respectively intersecting each of the other actual FOV pointing directions of the first plurality.

10. The method of claim 1, wherein making the first determination comprises determining that each respective actual FOV pointing direction of each wearable HMD of the first plurality traverses a path that passes within the first threshold distance of intersecting a common point in actual three-dimensional space,
   and wherein determining the three-dimensional spatial coordinates of the first point indicative of the location of the first region of actual space comprises determining three-dimensional spatial coordinates of the common point.

11. The method of claim 1, wherein making the first determination comprises determining that each respective actual FOV pointing direction of each wearable HMD of the first plurality intersects a common voxel in actual three-dimensional space.

12. The method of claim 1, wherein determining the first weighting value of the first region of actual space based on at least the number of wearable HMDs in the first plurality comprises determining the first weighting value as a value that increases as the number of wearable HMDs in the first plurality increases.

13. The method of claim 1, wherein determining the first weighting value of the first region of actual space based on at least the size of the first region of actual space comprises determining the first weighting value as a value that increases as the size of the first region of space decreases.

14. The method of claim 1, wherein determining the first weighting value of the first region of actual space further comprises determining a statistical likelihood of a random occurrence of the actual FOV pointing directions of the first plurality being within a first threshold distance of intersecting each other within the first region of actual space.

15. The method of claim 1, wherein the respective actual FOV pointing direction of at least one wearable HMD of the first plurality includes information indicative of eye pointing direction of a wearer of the at least one wearable HMD.

16. In a wearable head-mounted display (HMD), a computer-implemented method comprising:
   determining an actual location and an actual field-of-view (FOV) pointing direction of the wearable HMD;
   transmitting a data message to a device, the data message including information indicative of the determined actual location and the determined actual FOV pointing direction;
   receiving from the device information indicative of an actual three-dimensional location of one or more actual regions within which respective actual FOV pointing directions of two or more wearable HMDs are within a threshold of intersecting each other; and
   displaying information indicative of the location of at least one region of the one or more actual regions.

17. The method of claim 16, wherein determining the actual location and the actual FOV pointing direction of the wearable HMD comprises:
   determining a geographic location of the wearable HMD from a Global Position Satellite System location measurement; and
   determining an angular direction of a FOV axis corresponding to both an altitude angle measured with respect to a horizontal plane, and an azimuth angle measured with respect to a geographic reference direction.

18. The method of claim 17, wherein determining the actual FOV pointing direction of the wearable HMD further comprises determining an eye pointing direction of a wearer of the wearable HMD.

19. The method of claim 16, wherein transmitting the data message to the device comprises transmitting the data message via a wireless interface to a wireless access network.

20. The method of claim 16, wherein receiving from the device information indicative of the actual three-dimensional location of the one or more actual regions comprises receiving from the device data representative of a three-dimensional collective gaze map of a plurality of wearable HMDs.

21. The method of claim 16, wherein displaying the information indicative of the location of the at least one region comprises displaying a visual indicator in the display at one of two-dimensional display coordinates corresponding to the location as projected onto the display, and three-dimensional coordinates of virtual three-dimensional space.

22. The method of claim 21, wherein displaying the information indicative of the location of the at least one region further comprises displaying information indicative of a physical object located within the at least one region.

23. A device comprising:
   one or more processors;
   memory; and
   machine-readable instructions stored in the memory that, when executed by the one or more processors, cause the device to carry out functions including:
      receiving respective location-orientation data from each of a first plurality of wearable head-mounted displays (HMDs), the respective location-orientation data including information indicative of a respective actual location and a respective actual field-of-view (FOV) pointing direction of each of the first plurality of wearable HMDs,
      making a first determination that the actual FOV pointing directions of the first plurality are within a first threshold distance of intersecting each other within a first region of actual space,
      determining a first weighting value of the first region of actual space based on at least one of (i) a number of wearable HMDs in the first plurality, (ii) a size of a geographic region within which the wearable HMDs of the first plurality are located, (iii) a size of the first region of actual space, (iv) a size of the first threshold distance, or (v) a respective distance of the first region of actual space from each wearable HMD of the first plurality,
      determining three-dimensional spatial coordinates of a first point indicative of a location of the first region of actual space, and assigning the first weighting value to the coordinates of the first point, and
      transmitting information indicative of the first weighting value and the coordinates of the first point.

24. The device of claim 23, wherein the machine-readable instructions, when executed by the one or more processors, cause the device to carry out functions further including:
   receiving respective location-orientation data from each of a second plurality of wearable HMDs, the respective location-orientation data including information indicative of a respective actual location and a respective actual FOV pointing direction of each of the second plurality of wearable HMDs,
   making a second determination that the actual FOV pointing directions of the second plurality are within a second threshold distance of intersecting each other within a second region of space,
   determining a second weighting value of the second region of actual space based on at least one of (i) a number of wearable HMDs in the second plurality, (ii) a size of a geographic region within which the wearable HMDs of the second plurality are located, (iii) a size of the second region of actual space, (iv) a size of the second threshold distance, or (iv) a respective distance of the second region of actual space from each wearable HMD of the second plurality, and
   determining three-dimensional spatial coordinates of a second point indicative of a location of the second region of actual space, and assigning the second weighting value to the coordinates of the second point.

25. The device of claim 23, wherein causing the device to carry out the function of making a first determination comprises causing the device to carry out at least one of the functions of:
   determining that each respective actual FOV pointing direction of each wearable HMD of the first plurality is within the first threshold distance of respectively intersecting each of the other actual FOV pointing directions of the first plurality,
   determining that each respective actual FOV pointing direction of each wearable HMD of the first plurality traverses a path that passes within the first threshold distance of intersecting a common point in actual three-dimensional space, or
   determining that each respective actual FOV pointing direction of each wearable HMD of the first plurality intersects a common voxel in actual three-dimensional space.

26. The device of claim 23, wherein causing the device to carry out the function of determining the first weighting value of the first region of actual space based on at least one of (i) the number of wearable HMDs in the first plurality, (ii) the size of the geographic region within which the wearable HMDs of the first plurality are located, (iii) the size of the first region of actual space, (iv) the size of the first threshold distance, or (v) the respective distance of the first region of actual space from each wearable HMD of the first plurality comprises causing the device to carry out at least one of the functions of:
   determining the first weighting value based on the number of wearable HMDs in the first plurality by determining the first weighting value as a value that increases as the number of wearable HMDs in the first plurality increases, or
   determining the first weighting value based on the size of the first region of actual space by determining the first weighting value as a value that increases as the size of the first region of space decreases.

27. The device of claim 23, wherein the device is configured as part of a wearable computing device.

28. A wearable head-mounted display (HMD) comprising:
   a display device;
   one or more processors;
   memory; and
   machine-readable instructions stored in the memory that, when executed by the one or more processors, cause the wearable HMD to carry out functions including:
      determining an actual location and an actual field-of-view (FOV) pointing direction of the wearable HMD,
      transmitting a data message including information indicative of the determined actual location and the determined actual FOV pointing direction,
      receiving information indicative of an actual three-dimensional location of one or more regions within which respective actual FOV pointing directions of two or more wearable HMDs are within a threshold of intersecting each other, and
      displaying information indicative of the location of at least one region of the one or more actual regions.

29. The wearable HMD of claim 28, wherein causing the HMD to carry out the function of determining the actual location and the actual FOV pointing direction of the wearable HMD comprises causing the wearable HMD to carry out functions including:
   determining a geographic location of the wearable HMD from a Global Position Satellite System location measurement, and
   determining an angular direction of a FOV axis corresponding to both an altitude angle measured with respect to a horizontal plane, and an azimuth angle measured with respect to a geographic reference direction.

30. The wearable HMD of claim 28, wherein causing the HMD to carry out the function of determining the actual location and the actual FOV pointing direction of the wearable HMD comprises causing the wearable HMD to carry out the functions of:
   determining an eye pointing direction of a wearer of the wearable HMD.

31. The wearable HMD of claim 28, wherein causing the HMD to carry out the function of displaying information indicative of the location of the at least one region of the one or more actual regions comprises causing the wearable HMD to carry out the function of:
   displaying a visual indicator in the display device at one of two-dimensional display coordinates corresponding to the location as projected onto the display, and three-dimensional coordinates of virtual three-dimensional space.

32. A non-transitory computer-readable medium having instructions stored thereon that, upon execution by one or more processors of a device, cause the device to carry out functions comprising:
   receiving respective location-orientation data from each of a first plurality of wearable head-mounted displays (HMDs), the respective location-orientation data including information indicative of a respective actual location and a respective actual field-of-view (FOV) pointing direction of each of the first plurality of wearable HMDs;
   making a first determination that the actual FOV pointing directions of the first plurality are within a first threshold distance of intersecting each other within a first region of actual space;
   determining a first weighting value of the first region of actual space based on at least one of (i) a number of wearable HMDs in the first plurality, (ii) a size of a geographic region within which the wearable HMDs of the first plurality are located, (iii) a size of the first region of actual space, (iv) a size of the first threshold distance, or (v) a respective distance of the first region of actual space from each wearable HMD of the first plurality;
   determining three-dimensional spatial coordinates of a first point indicative of a location of the first region of actual space, and assigning the first weighting value to the coordinates of the first point; and
   transmitting information indicative of the first weighting value and the coordinates of the first point.

33. The non-transitory computer-readable medium of claim 32, wherein, the instructions, upon execution by the one or more processors, cause the device to carry out functions further comprising:
   receiving respective location-orientation data from each of a second plurality of wearable HMDs, the respective location-orientation data including information indicative of a respective actual location and a respective actual FOV pointing direction of each of the second plurality of wearable HMDs;
   making a second determination that the actual FOV pointing directions of the second plurality are within a second threshold distance of intersecting each other within a second region of actual space;

determining a second weighting value of the second region of actual space based on at least one of (i) a number of wearable HMDs in the second plurality, (ii) a size of a geographic region within which the wearable HMDs of the second plurality are located, (iii) a size of the second region of actual space, (iv) a size of the second threshold distance, or (iv) a respective distance of the second region of actual space from each wearable HMD of the second plurality; and determining three-dimensional spatial coordinates of a second point indicative of a location of the second region of actual space, and assigning the second weighting value to the coordinates of the second point.

34. The non-transitory computer-readable medium of claim 32, wherein making the first determination consists of at least one of:

determining that each respective actual FOV pointing direction of each wearable HMD of the first plurality is within the first threshold distance of respectively intersecting each of the other actual FOV pointing directions of the first plurality, determining that each respective actual FOV pointing direction of each wearable HMD of the first plurality traverses a path that passes within the first threshold distance of intersecting a common point in actual three-dimensional space, or determining that each respective actual FOV pointing direction of each wearable HMD of the first plurality intersects a common voxel in actual three-dimensional space.

35. The non-transitory computer-readable medium of claim 32, wherein determining the first weighting value of the first region of actual space based on at least one of (i) the number of wearable HMDs in the first plurality, (ii) the size of the geographic region within which the wearable HMDs of the first plurality are located, (iii) the size of the first region of actual space, (iv) the size of the first threshold distance, or (v) the respective distance of the first region of actual space from each wearable HMD of the first plurality consists of at least one of:

determining the first weighting value based on the number of wearable HMDs in the first plurality by determining the first weighting value as a value that increases as the number of wearable HMDs in the first plurality increases, or determining the first weighting value based on the size of the first region of actual space by determining the first weighting value as a value that increases as the size of the first region of space decreases.

36. A non-transitory computer-readable medium having instructions stored thereon that, upon execution by one or more processors of a wearable head-mounted display (HMD), cause the wearable HMD to carry out functions comprising:

determining an actual location and an actual field-of-view (FOV) pointing direction of the wearable HMD;

transmitting a data message including information indicative of the determined actual location and the determined actual FOV pointing direction;

receiving information indicative of an actual three-dimensional location of one or more actual regions within which respective actual FOV pointing directions of two or more wearable HMDs are within a threshold of intersecting each other; and displaying information indicative of the location of at least one region of the one or more actual regions.

37. The non-transitory computer-readable medium of claim 36, wherein determining the actual location and the actual FOV pointing direction of the wearable HMD comprises:

determining a geographic location of the wearable HMD from a Global Position Satellite System location measurement; and determining an angular direction of a FOV axis corresponding to both an altitude angle measured with respect to a horizontal plane, and an azimuth angle measured with respect to a geographic reference direction.

38. The non-transitory computer-readable medium of claim 36, wherein determining the actual location and the actual FOV pointing direction of the wearable HMD comprises determining an eye pointing direction of a wearer of the wearable HMD.

39. The non-transitory computer-readable medium of claim 36, wherein displaying information indicative of the location of the at least one region of the one or more actual regions comprises displaying a visual indicator in the display at one of two-dimensional display coordinates corresponding to the location as projected onto the display, and three-dimensional coordinates of virtual three-dimensional space.

* * * * *